United States Patent [19]
Iwasaki et al.

[11] Patent Number: 5,274,809
[45] Date of Patent: Dec. 28, 1993

[54] TASK EXECUTION CONTROL METHOD FOR A MULTIPROCESSOR SYSTEM WITH ENHANCED POST/WAIT PROCEDURE

[75] Inventors: Masaaki Iwasaki; Yoshifumi Takamoto, both of Hachioji; Shoji Yamamoto, Chigasaki; Takashi Sumiyoshi, Yokohama; Kazuo Masai, Yokohama; Toshiharu Shinozaki, Yokohama; Tetsuo Saito, Zama, all of Japan

[73] Assignee: Hitachi, Ltd. and Hitachi Microcomputer Engineering, Ltd., Tokyo, Japan

[21] Appl. No.: 940,347

[22] Filed: Sep. 3, 1992

Related U.S. Application Data

[63] Continuation of Ser. No. 356,365, May 24, 1989, abandoned.

[30] Foreign Application Priority Data

May 26, 1988 [JP] Japan ............... 63-127150
Dec. 26, 1988 [JP] Japan ............... 63-325796

[51] Int. Cl.⁵ .............................. G06F 9/46
[52] U.S. Cl. .......................... 395/650; 364/DIG. 1; 364/230.3; 364/230; 364/281.7; 364/281.3; 364/280
[58] Field of Search .......... 395/650, 375, 700, 775

[56] References Cited

U.S. PATENT DOCUMENTS

| | | | |
|---|---|---|---|
| 4,399,504 | 8/1983 | Obermark et al. | 364/200 |
| 4,553,202 | 11/1985 | Trufyn | 364/200 |
| 4,584,644 | 4/1986 | Larner | 364/200 |
| 4,812,968 | 3/1989 | Poole | 364/200 |
| 4,835,673 | 5/1989 | Rushby et al. | 364/200 |
| 4,847,754 | 7/1989 | Obermarck et al. | 364/200 |

FOREIGN PATENT DOCUMENTS 59-154563 9/1984 Japan.
59173535 7/1987 Japan.

OTHER PUBLICATIONS

Kelly Jr., K. F. "Device Fencing", IBM Technical Disclosure Bulletin, vol. 26, No. 3A, Aug. 1983, p. 985.
Gilbert et al., "Priority Control Method for a Resource Partitioning System", IBM Technical Disclosure Bulletin, vol. 18, No. 6, Nov. 1975, pp. 1942-1947.
"Selective Dispatch of Queued Tasks", IBM Technical Disclosure Bulletin, vol. 30, No. 5, Oct. 1987, pp. 373-374.
Tevanian, Jr. et al., "Mach Threads and the Unix Kernal: The Battle for Control", Carnegie-Mellon University, Aug. 1987 pp. 1-12.
Dinning, "A Survey of Synchronization Methods for Parallel Computers", Computer, Jul. 1989, pp. 66-77.
Bach, Maurice, "The Design of the Unix Operating System", pp. 33-35.
Hwang, K. et al., "Computer Architecture and Parallel Processing", pp. 557-565.

*Primary Examiner*—Kevin A. Kriess
*Attorney, Agent, or Firm*—Antonelli, Terry Stout & Kraus

[57] ABSTRACT

Task execution control for a multiprocessor wherein at a time point when a post issue task ends the use of a shared resource, the shared resource is released, another task which is running on another processor is allowed to lock the shared resource, and thereafter the task is made ready. After that, the post procedure is initiated, and thereafter through the high-speed dispatch procedure, the processor is granted first to a task which has failed to lock the shared resource, and the task is prompted to retry to lock the shared resource.

21 Claims, 16 Drawing Sheets

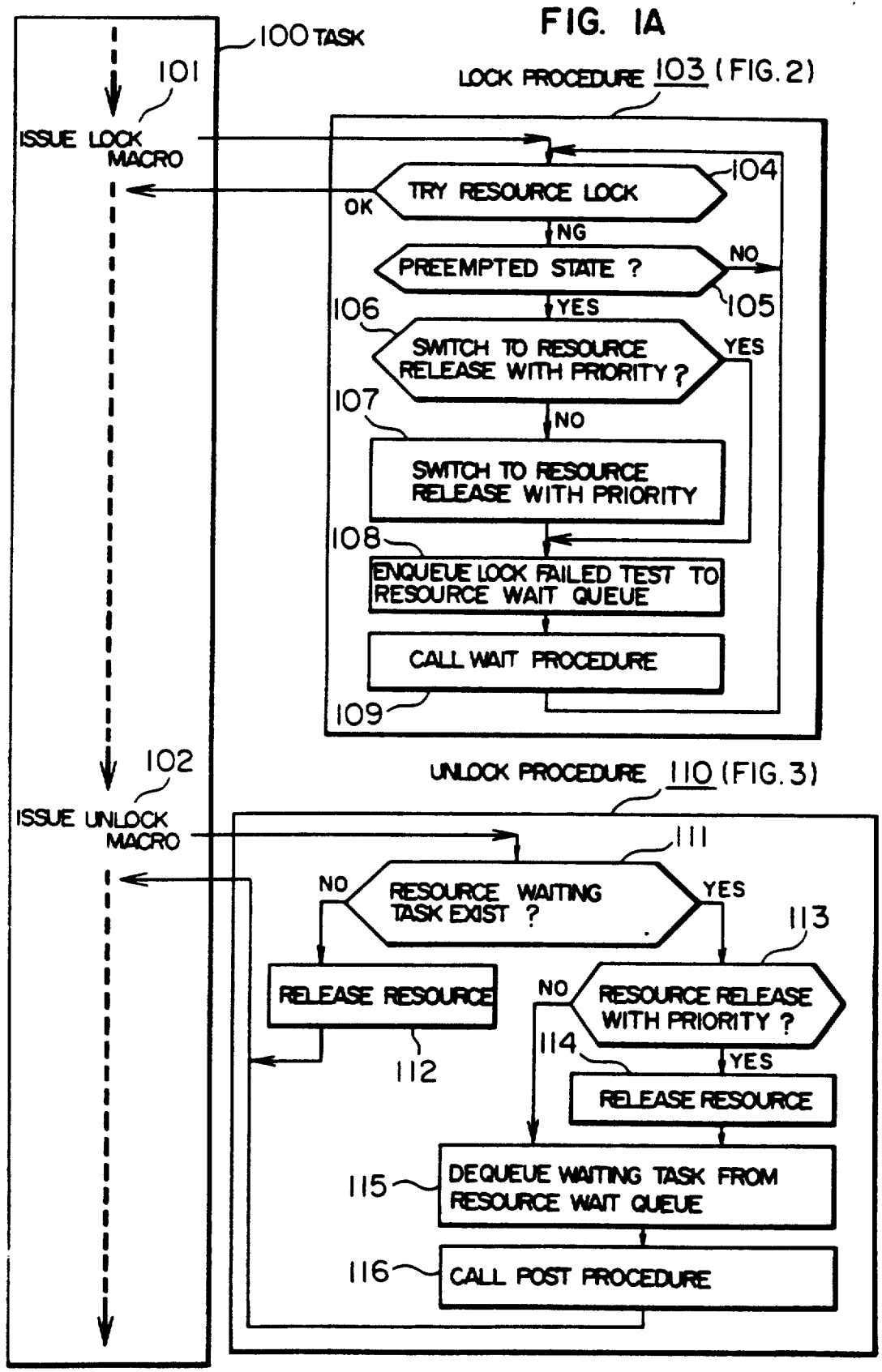

FIG. 5
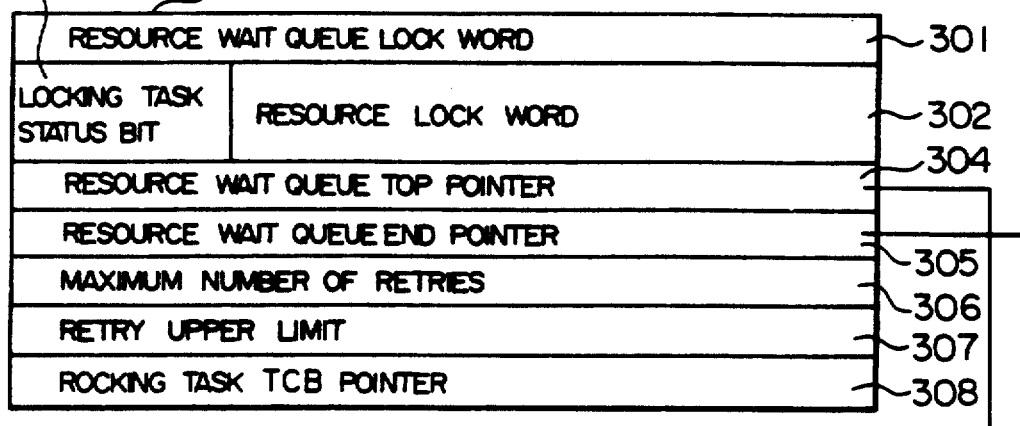
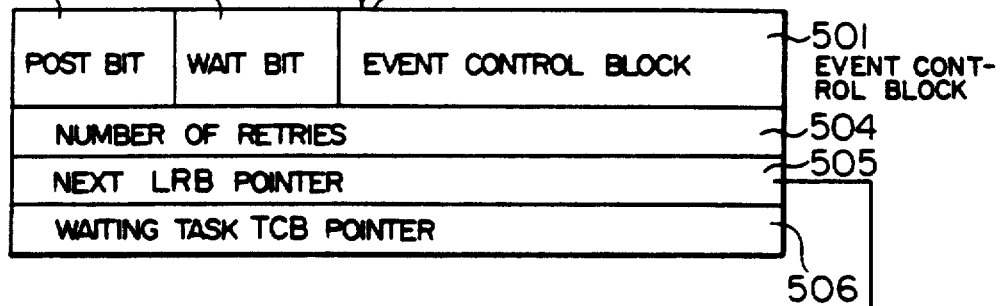
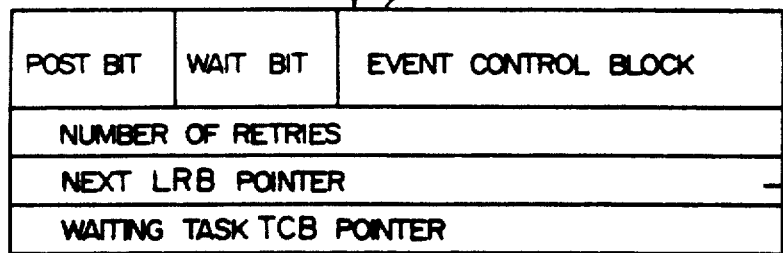
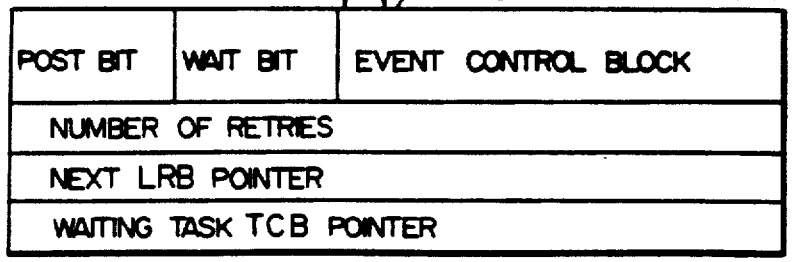

PROCESSOR WAIT QUEUE 900

RPIOR ART

TASK EXECUTION CONTROL METHOD FOR A MULTIPROCESSOR SYSTEM WITH ENHANCED POST/WAIT PROCEDURE

This application is a continuation of application Ser. No. 356,365, filed May 24, 1989, now abandoned.

BACKGROUND OF THE INVENTION

This invention relates to a multiprocessor computer system, and particularly, to a lock management scheme for shared resources.

A unit of processing (task) executed in a computer system uses various shared resources. In such as a, multiprocessor system, a plurality of tasks run concurrently and encounter contentions over the exclusive use of shared resources among the tasks. Therefore, lock management is required For example, when a plurality of tasks in an on-line system are running for the sales processing, these tasks make reference and revise the "current sales amount" in a common storage area individually. In this situation, when one task is making reference and revising the "current sales amount", other tasks must be inhibited from accessing the data.

Many of the prevalent computer systems have, a basic function of lock management and a hardware-based support of instruction which execute one-word reference-and-revision operations as unseparable operations, e.g., TEST AND SET instructions (TS instruction) and COMPARE AND SWAP instruction (CS instruction), as described in publication entitled "Computer Architecture and Parallel Processing", pp. 559-560, by K. Hwang and F. A. Briggs, published by McGraw Hill. However, a shared resource dealt with by lock management is not necessarily one word in the memory, and possibly it cannot be confined in one word as in the case of a disk-based data base.

Generally, lock management for the above-mentioned shared resources takes place as follows. The memory is provided, in addition to the areas for storing data of shared resources (numerous data A, B, C and so on of several K bytes each), a reference table, and one-word reference information (lock words) is stored in the table in correspondence to the shared data A, B, C and so on, so that the data are accessed for reference through the lock words.

The lock management for the data of shared resources can be accomplished by setting the exclusive-use (lock) flag in the lock word using the CS instruction or the like. At the beginning, the flag of the lock word is initialed (to 0 for example) so that it indicates that the shared resource is unlocked. A task which intends to lock the shared resource makes reference to the lock word using the CS instruction, and sets the flag to 1 if it is 0. On completion of exclusive use of the shared resource, the task resets the lock word to 0.

During the period when one processor makes reference to a lock word using the CS instruction, other processors are inhibited, on a hardware basis, to access to the lock word. Revision of a lock word fails unless it has been reset to 0. A task which has failed to revise the lock word, i.e., to lock the shared resource, using the CS instruction retries access repeatedly until it revises the lock word successfully In the following discussion, the acquisition of the right of using a shared resource exclusively will be termed "lock a resource", "have a lock of a resource", etc. The failure in locking a resource due to the exclusive use of it by another task will be termed "lock failure", "fail in lock acquisition", etc.

For the lock management in consideration of the retries in the case of lock failure, many prevalent computer systems employ the spin lock mechanism or wait/post mechanism, as described in JP-A-59-154563, JP-A-60128537, and JP-A-62-173535.

The spin lock mechanism is to repeat retries in a loop until the task locks the resource Namely, a task in need of a shared resource uses a processor exclusively and runs in a retry loop (spin loop) formed of a sequence of several instructions until it can lock the intended resource The wait/post mechanism is also called the suspend-/resume mechanism, block/activate mechanism, sleep/-wakeup mechanism, etc., and it carries out the wait procedure to bring a lock-failing task into a wait state and then invoke the post procedure to restore the task to the ready state, thereby accomplishing the lock management. Namely, the system for the mutual exclusion control of shared resources comprises a wait procedure which, when a shared resource is locked by a task 1, brings a lock-failing task 2 into the wait state, and a post procedure which frees the task 2 from the wait state when the task 1 (or a task which has used the shared resource after the task 1) releases the resource.

In the following discussion, "running state" denotes that a task is in execution through the exclusive use of a processor, and "ready state" denotes that a task is waiting for an available processor, i.e., the task is ready to run as soon as any of processors in the system becomes available. "Wait state" denotes that a task cannot be executed on a processor until it becomes ready upon removal of the wait-causing event; for example, a task which has issued a wait macro because of failure in resource lock enters the wait state until it is posted. "Preempted state" is a sort of ready state, and it denotes that the execution is suspended due to an interrupt procedure or the like.

A task which has failed in resource lock transfers control to the wait procedure routine. The wait procedure routine places the lock-failing task in the wait procedure routine places the lock-failing task in wait state and invokes the dispatcher. The dispatcher dispatches another task in the ready state to a processor which has been executing a task that has entered the wait state. In case more than one ready task exists, the dispatcher selects a ready task for the processor depending on the predetermined priority-based schedule or dispatch algorithm.

Each task checks the presence of tasks in the wait state (waiting tasks) immediately before releasing (unlocking) the shared resource and, upon detecting a waiting task, transfers control to the post procedure routine. The post procedure routine restores the ready state of the waiting task. The restored task is thereafter dispatched by a processor by the dispatcher, and it locks a shared resource and resumes the processing.

In the following discussion, a task which initiates the post procedure will be termed a "post issue task" and a task which is rid of the wait state will be termed a "post receive task". The post issue task, post receive task and wait task are not particular tasks having these names. Instead, any task can become a post issue task or a post receive task in each occasion.

SUMMARY OF THE INVENTION

The foregoing two lock management systems, i.e, spin lock mechanism and wait/post mechanism, involve a problem in that the number of dynamic steps expended for the execution of a task increases by the occurrence of lock contentions among tasks. Namely, a multiprocessor system has an increased number of dynamic steps of execution per task as compared with task execution by a single processor. The reason for the increased number of dynamic steps resides in an increased overhead of spin procedure or wait/post procedure due to lock contentions and an increased overhead of dispatch procedure attributable to the increase in wait/post procedures.

Accordingly, a first object of this invention is to overcome the foregoing conventional technology deficiencies and provide a lock management system which allows a third-party task to use a shared resource during a period after a post receive task has been granted a CPU by the dispatcher until it enters the ready status, thereby reducing the lock fail rate.

A second object of this invention is to provide a lock management system which prevents the sinking of locking tasks.

A third object of this invention is to provide a lock management system which reduces the lock fail rate and reduces the overhead of the dispatch procedure caused by the secondary lock contention on the task scheduling queue.

A fourth object of this invention is to provide a lock management system which reduces the increase in spin procedures caused by extended lock periods due to an interrupt.

According to this invention, a shared resource, which has been used by a post issue task, is released upon completion of the use, thereby allowing a third task in execution on another processor to lock the resource, and thereafter a post receive task is made ready by the post procedure, and thereafter a task which has failed to lock the resource is granted by the dispatch procedure to use the processor, and the post receive task is prompted to retry to lock the shared resource.

According to another aspect of this invention, the execution of a post issue task is suspended after a post receive task is rid of the wait state by the post procedure, and the processor on which the post issue task has been running is dispatched to the post receive task.

According to a further aspect of this invention, the execution of a post issue task is suspended after a post receive task has been made ready by the post procedure, control information pertinent to the post issue task is registered, the processor which has been running the post issue task is dispatched to the post receive task, a third task which has failed in resource lock is made ready by the wait procedure following the registration, the registered control information pertinent to the post issue task is retrieved, and the processor which has been running the third task is dispatched to the post issue task.

According to a further aspect of this invention, when the execution of a locking task is suspended by an external interrupt, information indicative of the status of discontinuity is stored as information on the execution status of the locking task, allowing a lock-intending task to reference the information so that it tries a spin-based locking when the locking task is in execution, or tries a wait/post-based locking when the locking task is suspended.

BRIEF DESCRIPTION OF THE DRAWINGS

FIG. 1A is a brief flowchart of the lock procedure and unlock procedure of the task execution control embodying the present invention;

FIG. 5 is a diagram showing the structure of the resource wait queue;

DESCRIPTION OF THE PREFERRED EMBODIMENT

Figure 1B:
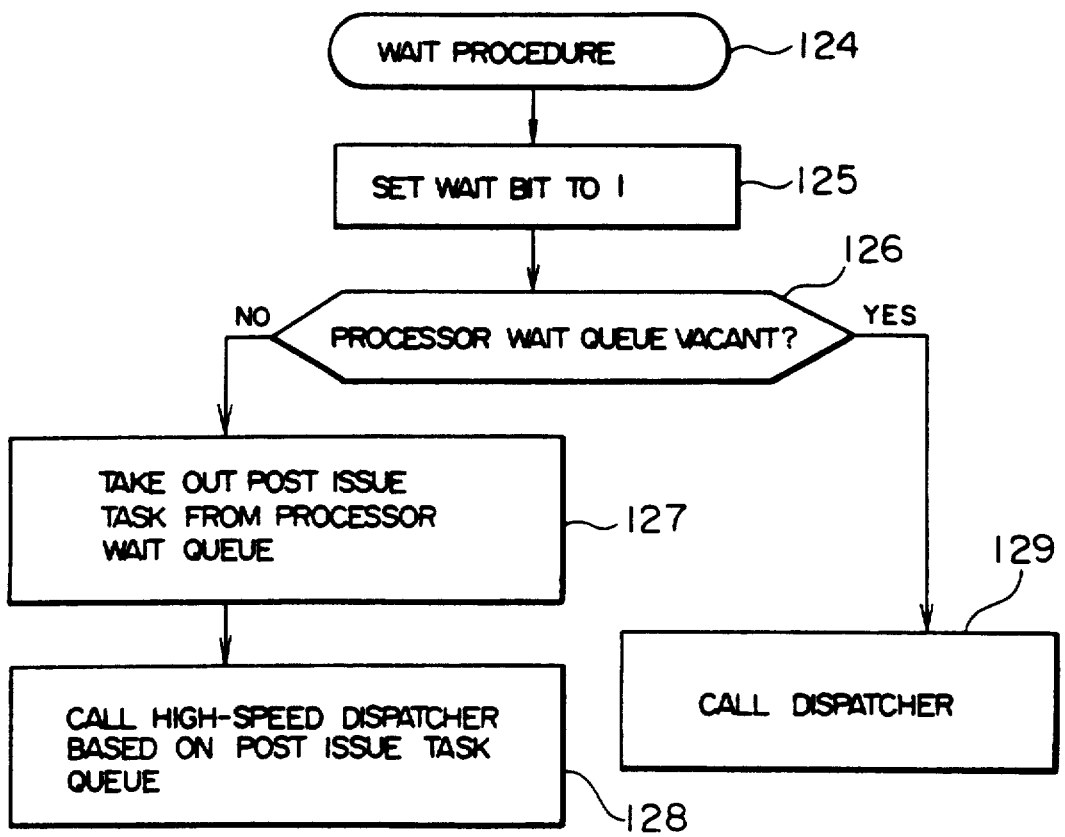
FIG. 1B is a brief flowchart of the wait procedure of the above, embodiment.

Before beginning the explanation of this invention, the problems of the conventional technology will be described in more detail with reference to FIG. 9.

The figure is a timing chart, with its time axis running downward, showing as an example the task operation at the occurrence of a lock contention, according to the conventional system. The figure shows the execution of tasks 1, 2, 3, 4, 5 and so on by three CPUs 1, 2 and 3. A hatched section directing the top right to the bottom left is the task 1, a hatched section directing from the top left to the bottom right is the task 2, blank sections are third tasks (tasks 3 to 5), thin doted sections are parts of a supervisor which does not belong to any task (it performs linkage among the tasks), and thick doted sections indicate that the shared resources are locked. The label LOCK indicates a lock procedure, POST indicates a post procedure, FAIL indicates a lock failure by a task, and DISP indicates a dispatch procedure for the task indicated by it.

At the beginning, the task 1 locks a resource on CPU 1 (at time $t_1$), and next the task 2 fails to lock (at $t_2$) and enters the wait state. Viewing the events, the task 1 terminates the lock upon ending the use of the shared resource and issues a post procedure to the task 2 (at $t_3$). Now, the task 2 locks the shared resource, but it is not granted a CPU (right of using a CPU) at this time point and does not enter the running state immediately (stays in ready state). Because of the priority ranks of the ready tasks, the task dispatched when a CPU becomes available is not necessarily the task 2 which has just acquired the resource. For example, when the CPU 2 becomes available, the task 4 at a higher execution rank can be dispatched (at $t_5$-$t_6$) and executed (at $t_6$-$t_7$) earlier. In this case, after the execution of the task 4 has completed, the task 2 is dispatched and executed (at $t_7$-$t_8$-$t_9$). During the period after the post procedure issuance by the task 1 to task 2 and until it enters the running state (at $t_3$-$t_8$), a lock request issued by another task on another CPU, such as the task 3, (at $t_4$), will fail even though the shared resource is not used by any task. In addition, when the task 2 has a post reception at $t_3$, if a higher-ranking task such as the task 4 is running, the task 2 is not granted to use the CPU until the execution of task 4 completes.

Figure 9:
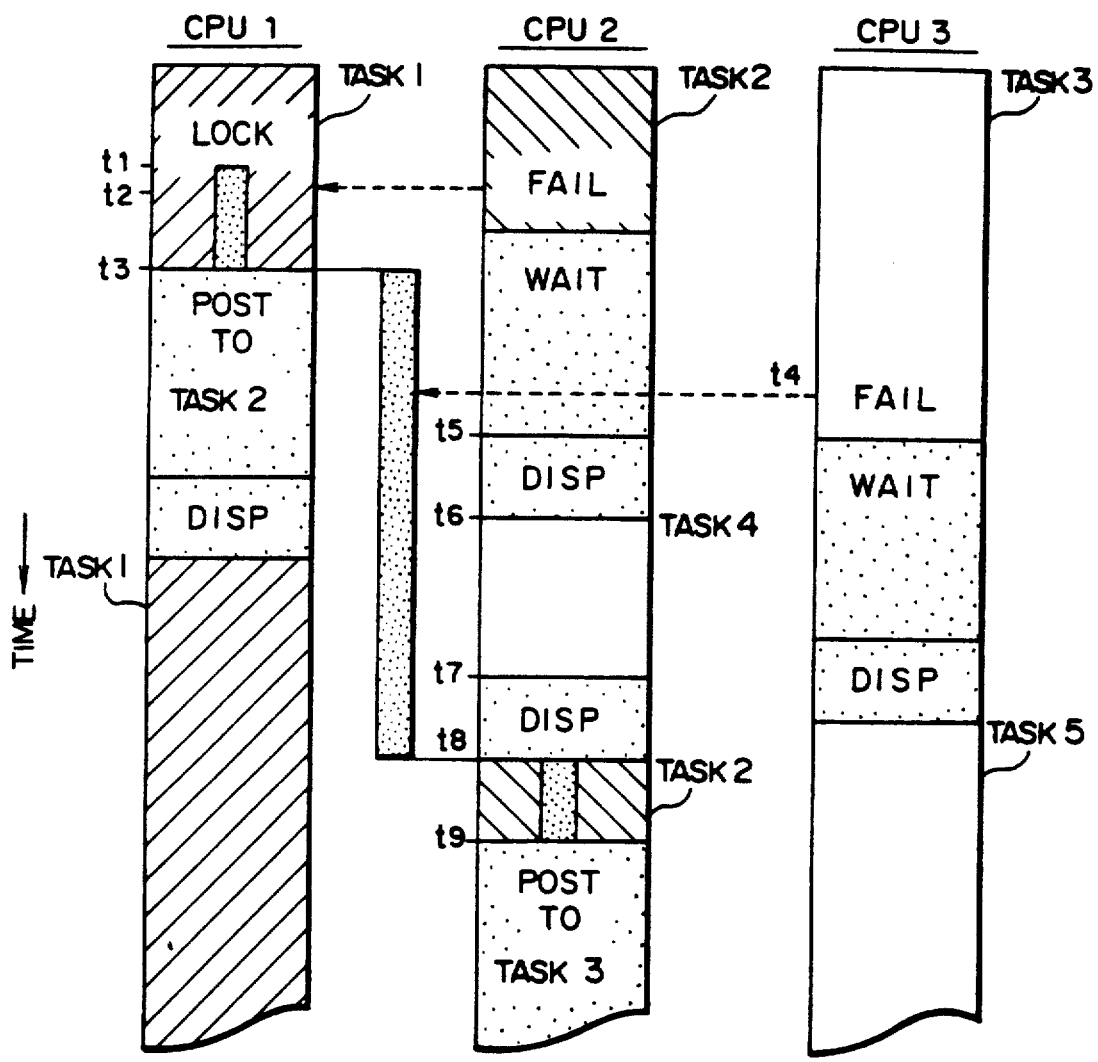
FIG. 9 is a timing chart showing the progress of task execution under the conventional task execution control.

In the example of FIG. 9, the CPU 1 and CPU 2 carry out the dispatch procedures concurrently at the time around $t_6$. Similarly, the CPU 2 and CPU 3 carry out the dispatch procedures concurrently at the time around t3. In the dispatch procedure, the task scheduling queue which administrates control information of all the tasks in the system must be locked until a task to be dispatched next is determined from among a plurality of ready tasks. If dispatchers operate concurrently on several processors as shown in FIG. 9, a lock contention will occur on the task scheduling queue. This secondary lock contention increases the number of steps needed for the dispatch procedure, and further increases the number of dynamic steps per task.

In addition to the above problems, a cause of aggravating the lock contention is the virtual increase in the lock period due to the suspension of a locking task caused by an external interrupt or the like. The following describes this problem using FIG. 10, which is another example of the task operation.

On a CPU 1 shown on the left-hand side of the figure, a task 1 (hatched section) locks a resource at $t_1$ and keeps the resource until $t_5$. The execution of the task 1 is suspended in its course at $t_3$ by an interrupt procedure (thin dotted section) until $t_4$. Another task 2 running on a CPU 2 shown on the right-hand side of the figure attempts to lock the resource at $t_2$, but fails because the resource is locked by the task 1 and then enters the spin loop. The task 2 continues spinning until $t_5$ when the task 1 releases the resource, and the CPU 2 is kept occupied by the task 2 only for the spin procedure. The duration between $t_3$ to $t_4$ is incomparably longer (several times to several tens times) than the lock period of task 1: $(t_3-t_1)+(t_5-t_4)$, leaving the CPU 2 to idle except for doing the spin procedure.

The situation is summarized as follows.

Subject 1

In the conventional wait/post mechanism, during the period after a post issue task (task 1 in this case) has commenced, the post procedure executes until a post receive task (task 2 in this case) has a processor and starts running, then no other task other than the post receive task is allowed to use the resource. Therefore a ratio of the lock procedure to the whole procedure becomes high, and the system performance is degraded. Particularly, in a multiprocessor system, during the period after a post issue task has commenced the post procedure until a post receive task has been dispatched of the processor and starts running, other tasks running on other processors issue lock requests, causing the lock fail rate (the probability of failing lock attempts) to rise and the post procedure and wait procedure to have increased overhead.

Subject 2

In the conventional wait/post mechanism, when a post receive task is rid of the wait state and made ready, and if a higher ranking task exists, the processor is dispatched to it first, and therefore the post receive task is not granted the processor promptly. This situation will be called "sinking of locking task". In the presence of a sink locking task, if another task attempts a resource lock, it always fails, resulting in an increased overhead of the post procedure and wait procedure.

Subject 3

The frequency of task switch increases in proportion to the increase in the wait/post procedure, resulting in an increased number of dispatch procedures. The dispatcher must lock the task scheduling queue, which administrates control information of all tasks in the system, until a task to be dispatched next is determined from among a plurality of ready tasks. This lock procedure is essentially inevitable for updating the task scheduling queue. In a multiprocessor system, where dispatchers operate concurrently on individual processors, an increase in the frequency of dispatch procedure can trigger lock contentions on the task scheduling queue. Such secondary lock contentions increase the number of steps required for the dispatch procedure, and further increases the number of dynamic steps per task.

Subject 4

The occurrence of an interrupt during a resource lock virtually prolongs the lock period due to the interrupt procedure. Moreover, upon completion of the interrupt procedure, the processor can be dispatched to other higher ranking task, resulting in the sinking of the interrupted task. Particularly, in the spin lock mechanism, many lock requesting tasks will enter the spin loop one after another during an interrupt procedure or during the sinking of a locking task.

(1) OVERVIEW

Figure 8:
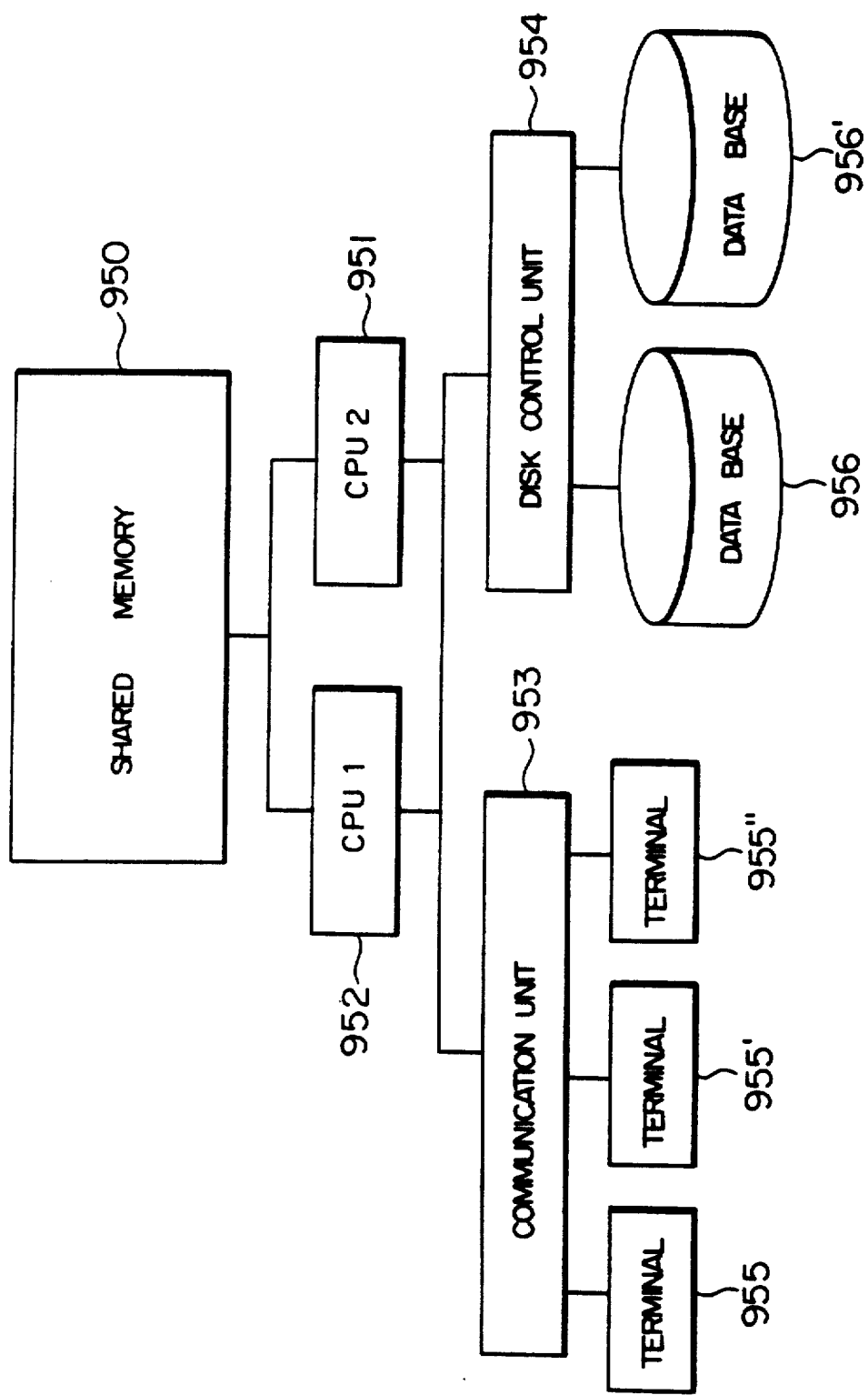
FIG. 8 is a brief block diagram of the online data base system to which this invention is applied.

FIG. 8 shows a block diagram of the online data base system to which the present invention is applied. In the system, a first processor 952 and second processor 951 are linked through a shared memory 950. The two processors operate in parallel by executing programs in the shared memory 950 and using the data in the memory 950. The shared memory 950 also stores a task scheduling queue, a resource wait queue, a processor wait queue, a lock control queue, etc. for use in the dispatch procedure and the lock control procedure. Each procedure transacts data with the terminal units 955 by way of a communication unit 953 and has access to a disk-based data base 956 by way of a disk control unit 954.

An event of data reference and/or revision procedure in the online data base system is called "transaction". For example, a series of processings for the withdrawal of deposit, including the confirmation of the balance, subtraction of the withdrawed amount from the balance and revising the balance in the data base, is a transaction. A transaction is initiated by data transmission from a terminal unit. In response to the entry of a transaction, the supervisor creates one or more tasks for the transaction. Specifically, the supervisor creates a task control block (TCB) 200 which contains task-specific control information, and administrates the TCB on the task scheduling queue until the end of the transaction. Each task registered on the task scheduling queue takes any of the wait state, ready state, preempted state and running state. A waiting task is waiting for the allowance of using a shared resource, and in this status, it is not granted a processor for execution. For example, a task which cannot have a resource and issues a wait macro stays in the wait state until it is posted. A ready task is waiting the dispatch of any available processor in the system. Conventionally, a waiting task does not become ready unless it locks a resource, whereas it is not always true in the embodiment of this invention. Suspended state is a sort of ready state, in which the task execution is discontinued due to an interrupt procedure or the like. A running task is a task which is in execution by a processor dispatched to it.

FIG. 1A shows in brief the lock procedure 103 and unlock procedure 110 based on this embodiment.

FIG. 1B shows in brief the wait procedure which is initiated by the lock procedure 103.

Figure 1C:
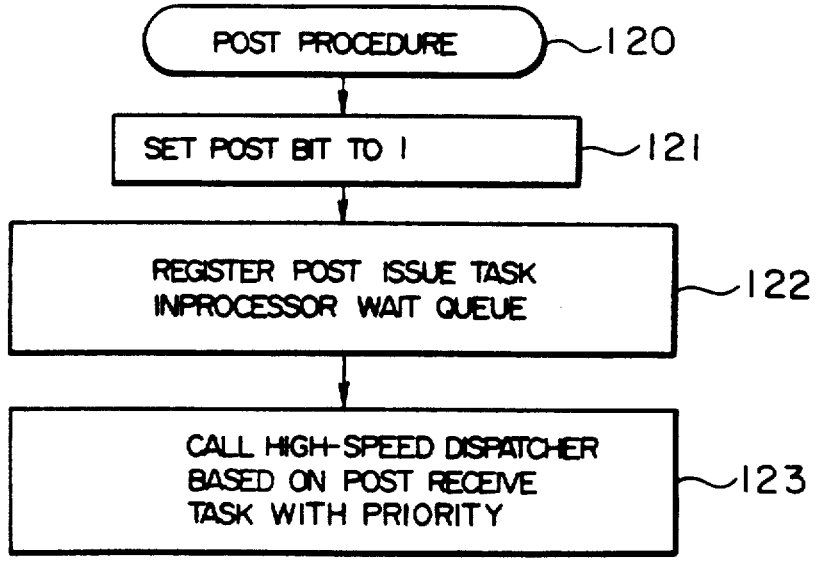
FIG. 1C is a brief flowchart of the post procedure of the above embodiment.

FIG. 1C shows in brief the post procedure which is initiated by the unlock procedure 110 in FIG. 1A.

Figure 1D:
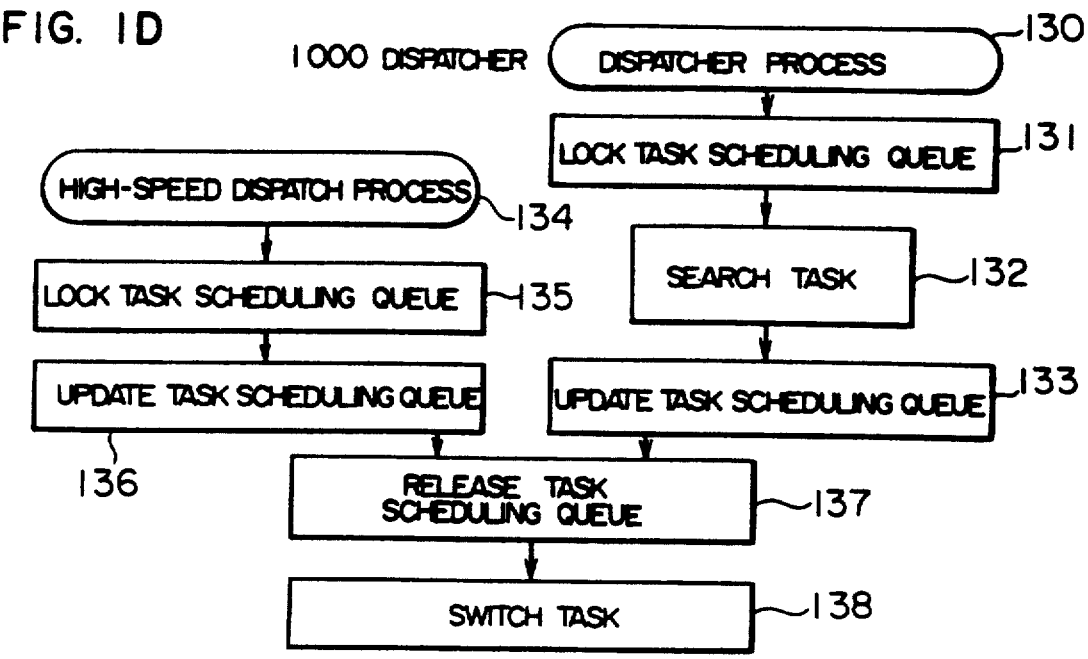
FIG. 1D is a brief flowchart of the dispatch procedure of the above embodiment.

FIG. 1D shows in brief the processing of the dispatcher 1000 which is initiated by the wait procedure of FIG. 1B or post procedure of FIG. 1C.

Figure 1E:
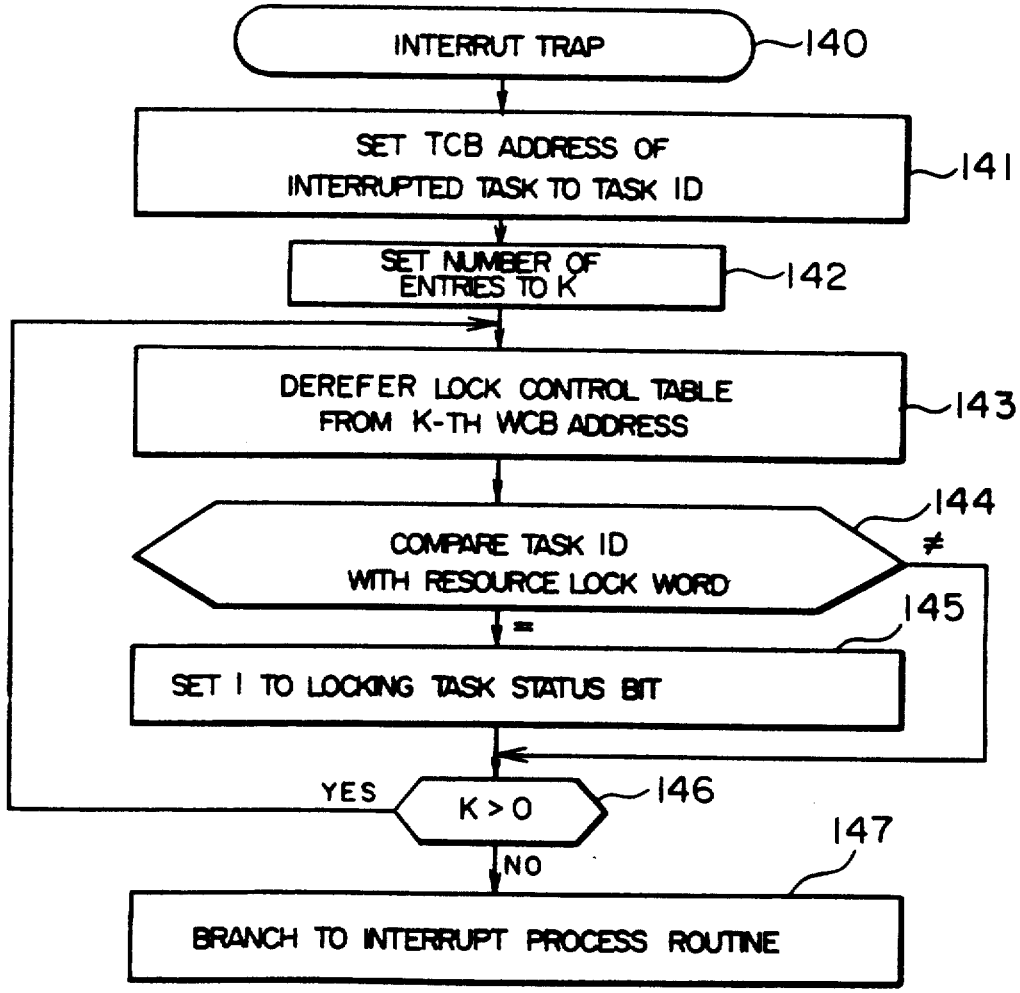
FIG. 1E is a brief flowchart of the interrupt trap procedure of the above embodiment.

FIG. 1E shows in brief the procedure which is carried out at the occurrence of an interrupt.

Figure 2:
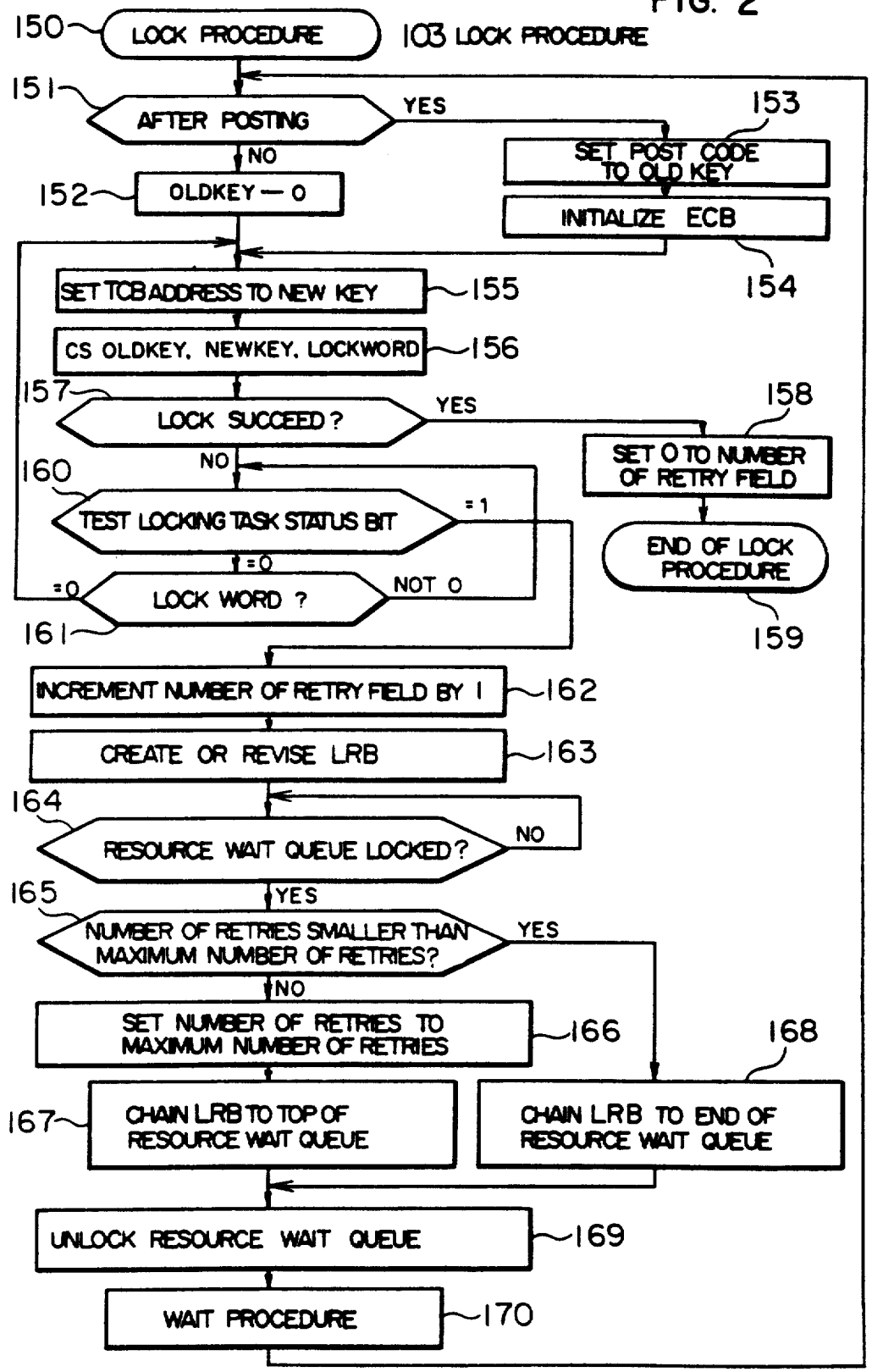
FIG. 2 is a detailed flowchart of the lock procedure shown in FIG. 1A.
Figure 3:
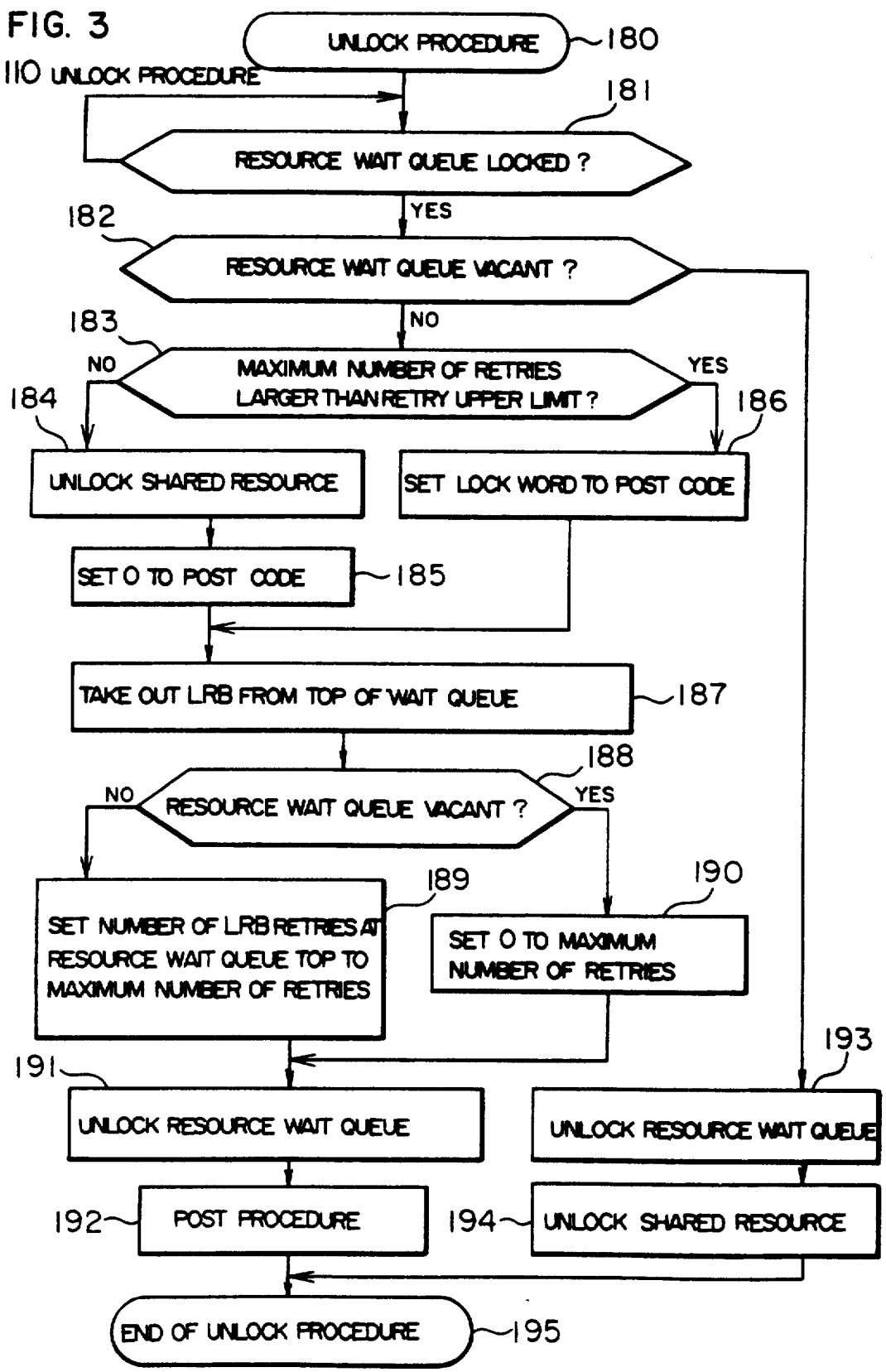
FIG. 3 is a detailed flowchart of the unlock procedure shown in FIG. 1A.

The details of the lock procedure 103 and the unlock procedure 110 in FIG. 1A are shown in FIGS. 2 and 3, respectively.

Features of this embodiment are as follows.

(a) At a time point when a post issue task ends the use of a shared resource, the shared resource is released: (step 114 in FIG. 1A), another task which is running on another processor is allowed to lock the shared resource, and thereafter the task is made ready: (step 115 in FIG. 1A). After that, the post procedure is initiated: (step 116 in FIG. 1A), and thereafter through a high-speed dispatch procedure (step 134-138 in FIG. 1D) a processor is granted first to a task which has failed to lock the shared resource, and the task (post receive task) is prompted to retry to lock the shared resource: (step 104 in FIG. 1A).

(b) This scheme, with its ability of minimizing the resource lock period, is advantageous in less possibility of inviting a degraded system throughput caused by the lock contentions. On the other hand, a post receive task can lose the resource lock due to the presence of another task, and repetitive lock retries by a the same task can lower the system response in some extent. This embodiment copes with the problem as follows. If one task fails to lock a shared resource even after several retries, it is allowed to lock the resource without letting the post issue task release the resource and the lock intending task (post receive task) is brought to a ready state (the same procedure as the conventional one shown by steps 113, 115 and 116 in FIG. 1A takes place). Specifically, the number of retries of the post receive task is counted: (step 162 in FIG. 2), and when the number is below a certain upper limit, the shared resource is released at the time of the unlock procedure and the post procedure is initiated: (steps 183, 184, 185 in FIG. 3), and if the number exceeds the upper limit, the post procedure is initiated without releasing the shared resource as in the conventional case: (step 186 of FIG. 3). In short, when a post receive task fails to lock a shared resource after several requests or when it uses a specific resource, it is allowed to lock the resource without the release of the resource.

(c) As mentioned in the above item (b), when the conventional scheme is used, in which a post receive task is allowed to lock a resource at the time of post procedure, the post receive task now having the resource lock can possibly sink if it is not granted a processor. Since the resource locked by the post receive task is also locked by the other task, it is kept locked. To cope with this problem in this embodiment, the execution of the post issue task is suspended by the post procedure: (step 122 in FIG. 1C) following the transition of the post receive task to the ready state, and the post receive task is executed immediately on the processor: (step 123 in FIG. 1C).

(d) In order to suppress the increase in the overhead of the dispatcher caused by the task switch, according to this embodiment, the post receive task is made ready by the post procedure: (step 115 in FIG. 1A), the execution of the post issue task is suspended: (step 122 in FIG. 1C), control information pertinent to the post issue task is placed on the processor wait queue 900 in FIG. 5: (step 122 in FIG. 1C), and the processor which has been executing the post issue task is dispatched to the post receive task: (step 123 in FIG. 1C). More preferably, dispatching of the processor to the post receive task is carried out invariably as follows. At the time when a third task which has failed in resource lock is brought to the wait state by the wait procedure following the registration on the processor wait queue, the control information for the post issue task registered on the processor wait queue is retrieved: (step 127 in FIG. 1B), and the processor which has been executing the third task is dispatched to the post issue task (step 128 in FIG. 1B), whereby the task search for dispatching is eliminated.

(e) In regard to the interrupt, when the execution of a locking task is suspended by an external interrupt or the like, information indicative of the discontinuity of the locking task is set immediately in the field (locking task status bit 303 in FIG. 5) which indicates the execution status of a locking task when a shared resource is locked (step 145 in FIG. 1E), allowing a lock intending task to reference the information: (step 160 in FIG. 2) so that it attempts a resource lock with a spin lock mechanism if the locking task is running: (steps 155-161 in FIG. 2), or attempts a resource lock with a wait/post mechanism if the locking task is in preempted state: (steps 162-170 in FIG. 2). Consequently, in case a locking task is suspended by an interrupt or the like, another task in execution in another processor is prevented from being trapped in the spin loop, and the processor which has been executing the lock failing task is switched to a third task, whereby the system is operated efficiently.

The embodiment will now be described in detail.

(2) CONTROL DATA STRUCTURE

The following describes the data structure of various queues and control blocks which are stored in the shared memory 950 in FIG. 8 accessible by all the processors in the system

(2-1) Task Scheduling Queue

Figure 4:
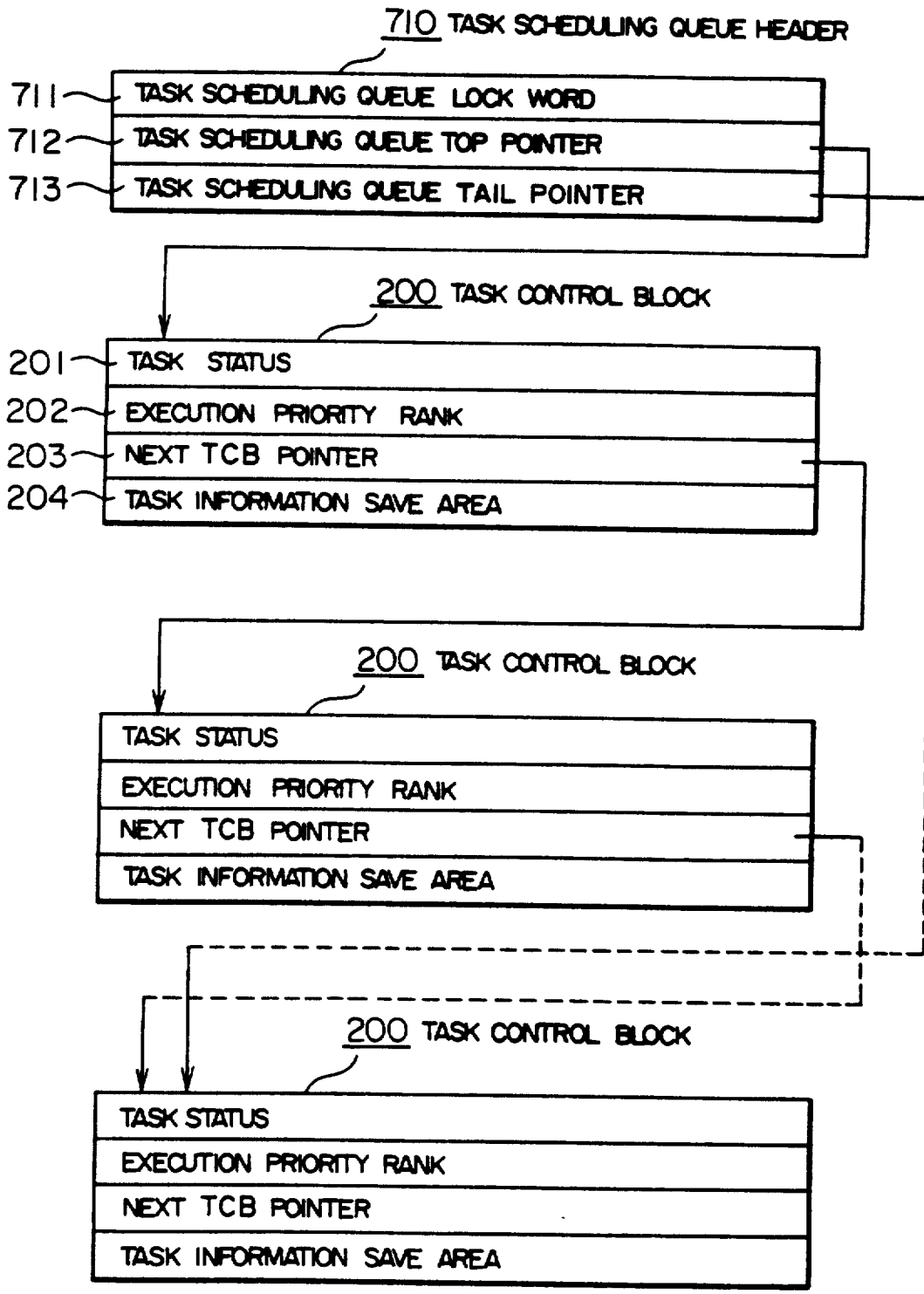
FIG. 4 is a diagram showing the structure of the task scheduling queue.

A task scheduling queue 700, which manages information used for task control, is made up of a task scheduling queue header 710 and one or more task control blocks TCBs 200 chained to the header, as shown in FIG. 4. The task scheduling queue 700 is unique in the whole system. The task scheduling queue header 710 is made up of a task scheduling queue lock word 711, a task scheduling queue top pointer 712 and a task scheduling queue tail pointer 713. The task scheduling queue lock word 711 is used for the exclusive access control of the task scheduling queue itself The task control blocks 200 store the following information.

(a) Task status 201

This field contains the state of a task (wait, ready, running or suspend)

(b) Execution priority rank 202

This field contains the execution priority rank of a task.

(c) Next TCB pointer 203

This field contains the address of the next TCB when TCBs are chained to form a task scheduling queue. The last TCB of the task scheduling queue has this field filled with zero.

(d) Task information save area 204

At the suspension of the task execution, this area is used to save the contents of PSW (program status word), registers, etc. for the resumption of the suspended task.

(2-2) Resource Wait Queue

A resource wait queue 800 is used to queue the tasks which have failed in the resource lock, and it is provided for each shared resource. In structure, the resource wait queue is made up of a wait control block (WCB) 300 and one or more lock request blocks (LRBs) 500 chained to the WCB, as shown in FIG. 5.

The wait control block 300 contains the following information.

(a) Resource wait queue lock word 301

This field is used for the mutual exclusion in revising the WCB itself The field is set to 1 during the occupancy of the WCB, and is reset to 0 when it becomes available.

(b) Resource lock word 302

This field indicates the locking status of the shared resource involved in mutual exclusion. A lock key is set to the field when the shared resource is locked, and it is reset to 0 when the resource is released. The lock key is an identifier unique to a locking task, and the TCB address is used for the lock key in this embodiment The leading one bit of the resource lock word is used to indicate the status of the locking task. The locking task status bit 303 of 0 indicates that the locking task is running, and the locking task status bit of 1 indicates that the locking task is purged from the processor by an interrupt or the like.

(c) Resource wait queue top pointer 304

This field contains the address of the leading LRB on the resource wait queue. It is reset to 0 when the resource wait queue is vacant.

(d) Resource wait queue tail pointer 305

This field contains the address of the last LRB on the resource wait queue. It is reset to 0 when the resource wait queue is vacant.

(e) Maximum retry count 306

This field indicates the maximum value among retry counts of LRBs on the resource wait queue.

(f) Retry upper limit 307

This is a positive integer indicating the upper limit of the lock fail count.

(g) Locking task TCB pointer 308

This field contains the TCB address of a task which is locking a resource The field is void when the resource is free.

The lock request block 500 contains the following information.

(a) Event control block (ECB) 501

Generally, in the wait/post mechanism, ECB denotes control information used to indicate occurrence of events among the post issue task and wait task. A post bit 502 of 0 indicates the event has not yet occurred and that of 1 indicates the occurrence of event. A wait bit 503 of 0 indicates that waiting of task has not yet occurred and that of 1 indicates the presence of the waiting task. Whereas, in this embodiment, this block is used to notify the release of the resource. The post code field in ECB is used to transfer the lock key from a post issue task to a post receive task. For the lock key, refer to the above item for the WCB resource lock word.

(b) Retry counter 504

This counter indicates the number of lock failures by the task. The counter is cleared to zero when the task can lock a resource.

(c) Next LRB pointer 505

When LRBs are chained to form a resource wait queue, this field contains the address of the next LRB. The field is reset to 0 if the LRB is the last of the resource wait queue.

(d) Wait task TCB pointer 506

This field contains the TCB address of the waiting task which corresponds to this LRB.

(2-3) Processor Wait Queue

Figure 6:
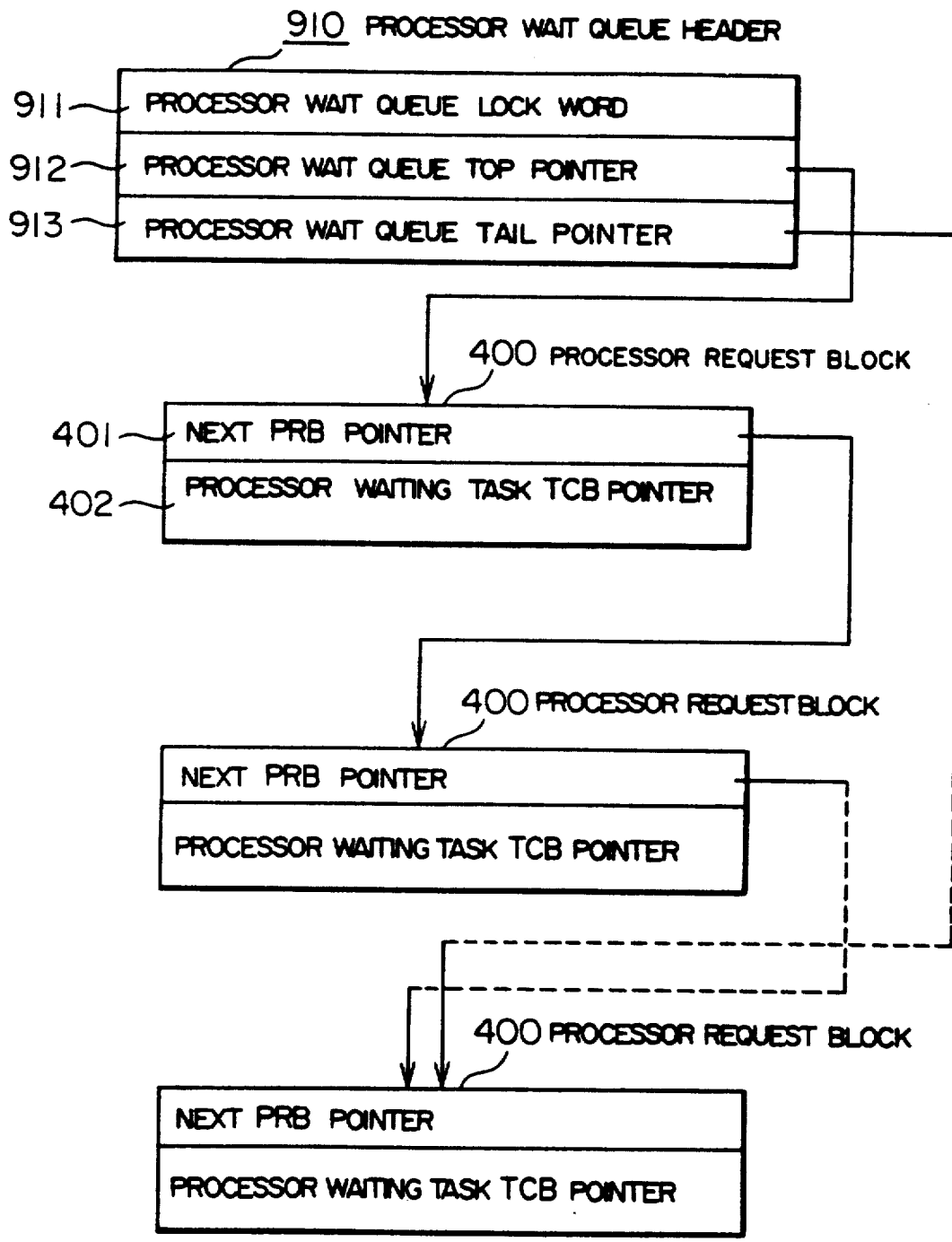
FIG. 6 is a diagram showing the structure of the processor wait queue.
Figure 7:
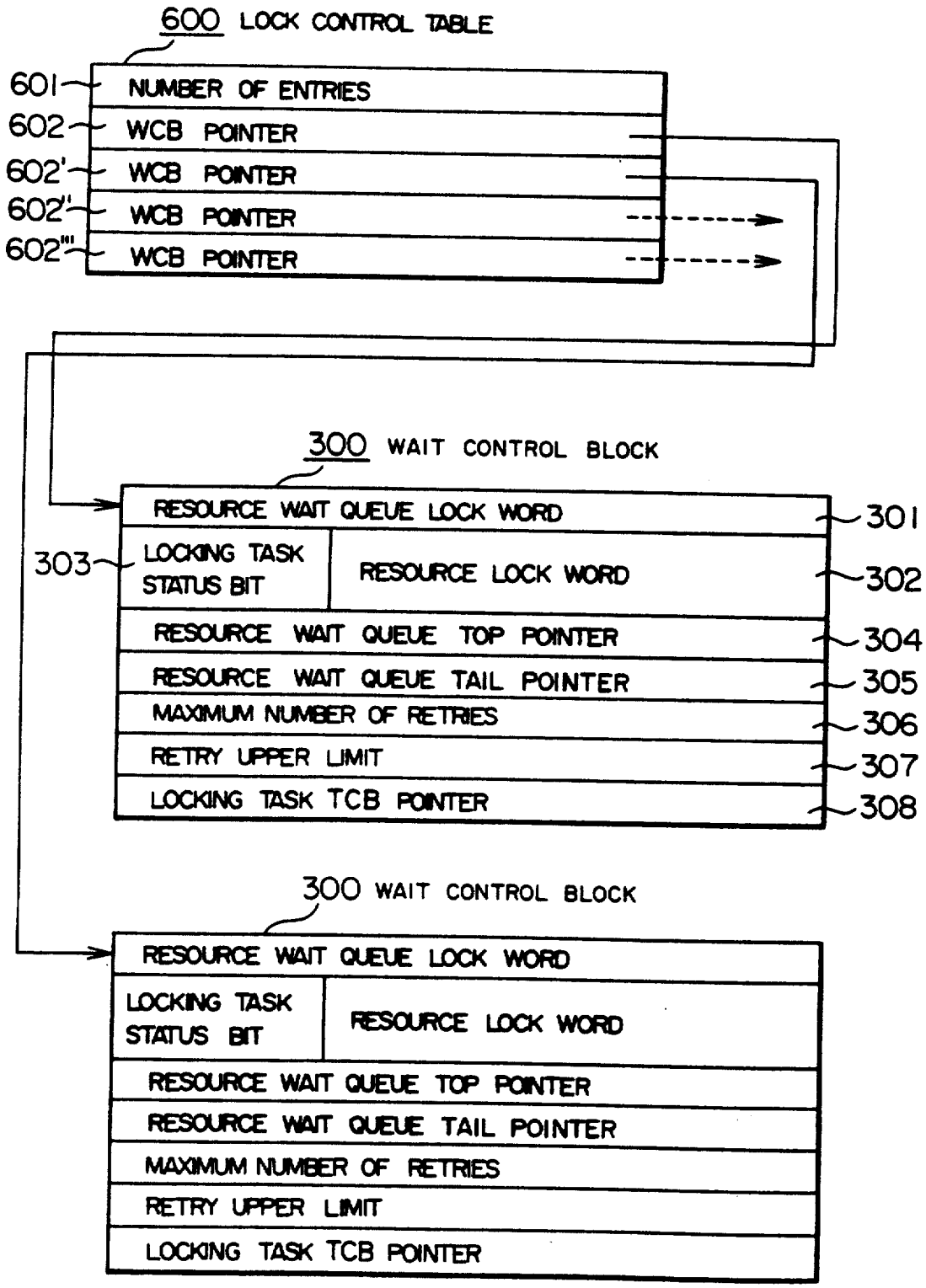
FIG. 7 is a diagram showing the structure of the lock control table.

A processor wait queue 900 registers tasks which have lost processors at the post issuance, and it is made up of a processor wait queue header 910 and one or more processor request blocks (PRBs) 400 chained to the header, as shown in FIG. 6. The processor wait queue 900 is unique in the whole system The processor wait queue header 910 is made up of a processor wait queue lock word 911, processor wait queue top pointer 912 and a processor wait queue end pointer 913 The processor wait queue lock word 911 is used for the exclusive access control of the processor wait queue itself.

The processor request block 400 contains the following information.

(a) Next PRB pointer 401

This pointer indicates the address of the next PRB when PRBs are chained to form a processor wait queue. If the PRB is the last of the processor wait queue, this field is reset to 0.

(b) Processor waiting task TCB pointer 402

This pointer indicates the TCB address of the processor waiting task which corresponds to this PRB.

(2-4) Lock Scheduling Table

A lock scheduling table 600 is used by the interrupt trap routine shown in FIG. 1E at the occurrence of an interrupt for examining whether or not the interrupted task has been locking a resource The table 600 is a stored array of pointers 602 to the WCBs of respective shared resources, and it is unique in the system.

(3) CONTROL ALGORISM

(3-1) Lock Management

First, the lock procedure 103 and unlock procedure 110 will be explained on FIG. 1A, beginning with the lock procedure 103.

A task which intends to lock a shared resource issues a lock macro 101 thereby to invoke the lock procedure routine 103. If the task fails to lock the intended resource because of it being locked by another task, the procedure branches to step 105. The step 105 examines whether the locking task is running or preempted. If the task is found running, it retries locking immediately. If it is preempted, the procedure branches to step 106, which selects the primary lock control mode (resource release with priority mode) or the second lock control mode in which the resource does not become available before the commencement of post procedure. Step 107 is for the resource release mode.

Subsequently, the lock macro issuing task is enqueued on the resource wait queue 800: (step 108), and the wait procedure routine of FIG. 1B in the supervisor is invoked so that the task has its status field 201 in TCB 200 set to "wait". To enqueue the task in the resource wait queue 800 by step 108 is to create a LRB 500 which points TCB 200 of this task and chain it to the LRBs 500 on the resource wait queue 800. The task which is now in wait state stays in this state until it is restored to ready state by a post procedure of FIG. 1C issued by another task.

Next, the unlock procedure will be explained. A task which intends to release a shared resource issues an unlock macro 102 thereby to invoke the unlock procedure routine 110. The unlock procedure routine 110 examines whether any waiting task is registered on the resource wait queue 800: (step 111). If no waiting task exists, the system releases the resource: (step 112), and goes out of the routine. If any waiting task exists, the procedure branches to step 113, which selects the primary lock control mode (resource release with priority mode) in which the resource is released before the commencement of post procedure or the secondary lock control mode in which the resource is not released before the commencement of post procedure. If the resource release with priority mode is selected, the resource is released by step 114. Subsequently, a waiting task is dequeued from of the resource wait queue 800: (step 115), and the post procedure routine of FIG. 1C is invoked thereby to notify the release of the resource. To dequeue a task from the resource wait queue 800 (FIG. 5) by step 115 is to remove the lock request block LRB 500 which points the TCB of this task from the LRB chain 500 on the resource wait queue 200 so that it is rid of resource wait state and brought to processor wait state (ready state). In the case of the resource release with advantage mode, the revised task can not always lock the resource, but becomes available during wait state, as opposed to the conventional system.

(3-2) Dispatch Procedure

The dispatch procedure will be explained on FIGS. 1B to 1D.

In the post procedure routine (FIG. 1C), 1 is set to the post bit 502 in the LRB 500 corresponding to the waiting task which has been dequeued from the resource wait queue 800 by step 115 in FIG. 1A. Next, the post issue task is brought from running state to ready state and enqueued to the processor wait queue 900: (step 122), and the high-speed dispatcher of FIG. 1D is invoked: (step 123) to dispatch a processor to the post receive task (i.e., the former waiting task), and it is brought to running state. To enqueue a task on the processor wait queue 900 by step 122 is to create a processor request block PRB 400 which points the TCB 200 of this task, and chains it to PRBs 400 on the processor wait queue 900. The processor-granted post receive task can now resume the procedure by locking the shared resource.

In the wait procedure routine (FIG. 1B), an LRB 500 for the task which has issued the wait macro is created, and 1 is set to the wait bit 503 in the LRB. The routine next examines whether a processor waiting task, i.e., ready task, is registered on the processor wait queue 900: (step 126). If a ready task is found, it is dequeued from the processor wait queue 900: (step 27), and the high-speed dispatcher is invoked: (step 28) to dispatch a processor to this task and bring it running. To dequeue a task from the processor wait queue 900 by step 127 is to unchain the PRB 400 which points the TCB 200 of this task from PRBs 400 on the processor wait queue 900. If no ready task is found in step 126, the dispatcher is invoked: (step 129), and a task to be dispatched is selected from among ready tasks on the task scheduling queue and a processor is dispatched to it.

The difference between the dispatch procedure and high-speed dispatch procedure shown in FIG. 1D is the presence or absence of a task search step 132. The task search step 132 is to search a TCB having a task ready state by dereferencing the chain of TCBs on the task scheduling queue 700. During the task search, the mutual exclusion of spin lock mode is carried out using the task scheduling queue lock word 711 so that another processor does not revise the TCBs 200 chained on the task scheduling queue 700.

The high-speed dispatch procedure does not include task search, and when it is called by the post procedure, it can immediately select a post receive task dequeued from the resource wait queue 800 by step 115. The reason is that the LRBs 500 on the resource wait queue 800 and the PRBs 400 on the processor wait queue 900 have individual pointers to TCBs 200 on the task control queue 700. By dereferencing the pointers, the TCB 200 for the LRB 500 dequeued from the resource wait queue 800 can be detected without searching the task control queue 700. The TCB 200 for the PRB 400 taken out of the processor wait queue 900 can also be detected without searching the task control queue 700. In the case of a call from the wait procedure, the post issue task dequeued from the processor wait queue 900 by step 127 can be selected promptly. Accordingly, in the post procedure (FIG. 1C), by granting a processor to the task (post receive task) corresponding to the LRB 500 taken out of the resource wait queue 800, the dispatch procedure (FIG. 1D) can take place without searching the task control queue 700. Similarly, in the wait procedure (FIG. 1B), by granting a processor to the task (post issue task) corresponding to the PRB 400 dequeued from the processor wait queue 900, the dispatch procedure (FIG. 1D) can take place without searching the task control queue 700. Application of the high-speed dispatch procedure reduces secondary lock contentions on the task scheduling queue.

(3-3) Interrupt Control

The interrupt procedure will be explained on FIG. 1E.

When an interrupt arises at the end of input/output or the like, control is transferred to the interrupt trap 140 in FIG. 1E. At first, step 141 detects the ID (TCB address) of the interrupted task: (step 141). Subsequently, by dereferencing WCB pointers 602 in the lock control table 602): (steps 142, 143), the ID (TCB address) of the interrupted task is compared with a lock key (TCB address of locking task) set in the resource lock word 302 of each WCB 300: (step 144). If both IDs are equal, the locking task status bit of the WCB 300 is set to 1: (step 144). Upon completion of this procedure for all the entries of the lock control table, the procedure branches to the usual interrupt procedure routine: (steps 146, 147). The lock control table 600 contains pointers 602 to WCBs 300, and the resource lock word contains the TCB address, which corresponds to the locking task, as a lock key. Accordingly, the interrupt trap routine (FIG. 1E) can revise the locking task status bit 303 of the resource lock word 302 in correspondence to the interrupted task in a short time.

(3-4) Details of Lock Procedure and Unlock Procedure

The following explains in more detail the lock management mechanism described in item (3-1). While a task is locking a shared resource, the task TCB address is set in the lock word, or it is reset to 0 when the task does not lock the resource. Since a TCB is created for each task, the TCB address is used as task identification information. The TCB address is used as the lock key in the following discussion.

First, the lock procedure 103 will be explained on FIG. 2. At first, after being posted by another task, a test step 151 determines whether or not the task status is after the wait state based on the value of the post bit 502 in the ECB 501. If it is found to be posted, the old lock key, i.e., post code in ECB 501, is loaded into a register 1 (R1): (step 152). The post code contains identification information ID of the post issue task (TCB address of post issue task). Otherwise, 0 is loaded to the register 1: (step 153). Next, a new lock key, i.e., identification information ID of the self task (TCB address of self task) is loaded into a register 2 (R2): (step 155). The decision procedure is carried out using the CS instruction as follows.

CS R1, R2, LOCKWORD

This instruction compares the value of the lock word with the old lock key contained in the register 1, and if the values are equal, the value of the lock word is replaced with a new lock key contained in the register 2, i.e., lock success. If the above comparison does not match, the lock word replacement does not take place, i.e., lock failure. An important ability of the CS instruction is the inhibition of access to the lock word from other another CPU over the period from reading of the lock word, comparison and to revision. On this account, an attempt of lock by a task results in failure except for the case where the resource is unlocked or the case where the value of the old lock key passed as a post code from the post issue task is equal to the current value (at execution of the CS instruction) of the lock word.

In the case of a successful lock by the decision step 157, step 158 resets the number of retry field to zero to complete the lock procedure. In the case of a lock failure, a retry is attempted immediately when the locking task status bit 303 is 0. Namely, with the bit 303 being 0, the procedure branches to step 161 and enters the spin loop 155–161. Step 161n tests the condition of the resource, and if it is found free, the procedure branches to the right for looping. If the resource is not yet released, the procedure branches to the left for looping. During the spin loop of steps 155–161, when the resource becomes available, the procedure branches to step 158, resulting in a lock success. With the locking task status bit 303 being 1, the procedure branches to step 162 and commences the suspending procedure. The number of retry field is incremented by one: (step 162), and the resource wait queue is locked: (step 164). While another task is locking the resource wait queue, the procedure loops until the procedure of the other task completes. Following a successful lock of the resource wait queue, the number of retry fields is compared with the maximum number of retries: (step 165).

If the number of retries is greater than or equal to the maximum number of retries, the maximum number of retries is updated: (step 166), and the LRB of the self task is chained to the top of the resource wait queue: (step 167).

If the number of retries is smaller than the maximum number of retries, the LRB of the self task is chained to the end of the resource wait queue: (step 168). After the LRB has been chained to the resource wait queue, the queue becomes available and the wait macro is invoked: (step 170). The task which has issued the wait macro enters the wait state and stays in this state until it is posted, at which time the task returns to the procedure and attempts a resource lock.

The ECB is initialized (clear post bit) in step 154. In steps 167 and 168, the resource wait queue top pointer and resource wait queue tail pointer are used, instead of searching the resource wait queue, for the sake of reducing the lock period of the resource wait queue. The interrupt is disabled while the resource wait queue is locked for avoiding the occurrence of deadlock with the interrupt task.

Next, the unlock procedure 110 will be explained on FIG. 3. The first thing to be done in the unlock procedure is to lock the resource wait queue: (step 181). If another task is locking the resource wait queue, the procedure waits in the loop until it becomes available. After the resource wait queue is locked successfully, the vacancy of the resource wait queue 800, i.e., whether there exists a task which is waiting for the release of the shared resource, is check: (step 182). If no waiting task exists, the resource wait queue 800 and shared resource are released by resetting the lock word to 0: (steps 193, 194).

If, on the other hand, there is a waiting task, the maximum number of retry fields is compared with the retry upper limit: (step 183). If the maximum number of retries is smaller than the retry upper limit, i.e., if the number of lock failures is below the upper limit, the shared resource is released (step 184), and the post code is set 0: (step 185). If the maximum number of retries is greater than or equal to the retry upper limit, i.e., if the number of lock failures reaches the upper limit, the current lock key, i.e., the identification information (TCB address) of the current locking task is set to the post code: (step 196). Subsequently, the LRB at the top of the resource wait queue is taken out: (step 187), the maximum number of retries is updated: (steps 189, 190), the resource wait queue is released: (step 191), a post macro is issued to the task corresponding to the LRB 500 taken out in step 187: (step 192), and the release of the shared resource is notified. At this time, the post code which has been set in step 185 or 186 is passed to the post receive task. The post code is received by the post receive task in step 153 (FIG. 2). According to this mechanism, when the number of lock failures is less than the upper limit value, the shared resource released by step 184 is offered among the post receive task and other tasks on a first-come-first-served basis. However, if the number of lock failures is beyond the upper limit value, the shared resource is not released at the post issue task, but the post receive task is allowed directly to lock the resource

(4) Features of the Embodiment

The following describes in detail the features of this embodiment.

(a) In the conventional mechanism, when a task 1 which has been locking a shared resource ends the use, it does not release the shared resource, but it posts a waiting task 2, and during the period until the task 2 runs again on the CPU 2, another lock-intending task 3 in execution on the CPU 3 fails to lock the resource, as described on FIG. 9. According to this embodiment, at the time point when a post issue task ends the use of a shared resource, it releases the shared resource (step 114 in FIG. 1A), allows another task running on another processor to lock the shared resource, and then the post issue task is brought to the ready state: (step 115 in FIG. 1A). After that, the post procedure is initiated: (step 115 in FIG. 1A), and through the high-speed dispatch procedure (steps 134-138 in FIG. 1D) a processor is granted to a task which has failed to lock the resource previously and the task (post receive task) is prompted to retry the lock of the shared resource.

Accordingly, the task 1 releases the shared resource prior to (at time point $t_3$) the post procedure commencement (at $t_5$), and during the period after the task 2 which had entered the wait state at $t_4$ has been posted by the task 1 until it is ready again on the CPU 1 (between $t_5$-$t_7$), another task 3 in execution on the CPU 3 can lock the shared resource (at $t_6$). As a result, the number of wait procedures and post procedures can be reduced.

(b) This mechanism is capable of minimizing the resource lock period, and is therefore advantageous in preventing a degraded throughput caused by lock contentions. However, before a post receive task locks a shared resource, it can be locked by another task, resulting possibly in a recursive lock failure This causes the same task to have a iteration of retry, and the system response can be deteriorated to some extent This problem is overcome by this embodiment as follows.

In case the same task fails to lock a shared resource as a result of iterative retries, the task is allowed to lock the resource without the release of the resource, and the task (post receive task) is brought to ready, as in the conventional mechanism (steps 113, 115 and 116 in FIG. 1A). Specifically, the number of retries attempted by the post receive task is counted: (step 162 in FIG. 2), and if the number is below the upper limit value, the shared resource becomes available and the post procedure is initiated at the execution of unlock procedure: (steps 183, 184 and 185 in FIG. 3). If the number of retries reaches or is beyond the upper limit, the post procedure is initiated without releasing the shared resource (step 186 in FIG. 3), as in the conventional mechanism Namely, if a post receive task fails to lock a shared resource after repeated requests, or when a specific resource is used, the post receive task is allowed to lock the shared resource without release.

For a lock fail rate (the probability of failure in lock attempts) of $\beta$ and a retry upper limit value of N, the probability of N-time recursive lock failures is $\beta^N$. Since $\beta$ ranges between 0 and 1 ($0<\beta<1$), the value of $\beta^N$ is Sufficiently small. Accordingly, it becomes possible to minimize the probability ($\beta^N$) of resource lock over the period after the commencement of post procedure until the reentry of the task 2 in the running state following its retries over the upper limit value, and at the same time to maintain the number of retries by the task 2 N times or lower.

(c) As described above in item (b), in using the conventional mechanism in which the post receive task is allowed to lock a shared resource at the time of post procedure, the post receive task can sink, i.e., it is not granted a processor while even having a resource lock. In this case, the resource is kept locked by the task, and another task cannot use it. To cope with this problem in this embodiment, after the post receive task is running by the post procedure, the execution of the post issue task is preempted: (step 122 in FIG. 1C) and the post receive task is executed immediately on that processor: (step 123 in FIG. 1C).

Figure 12:
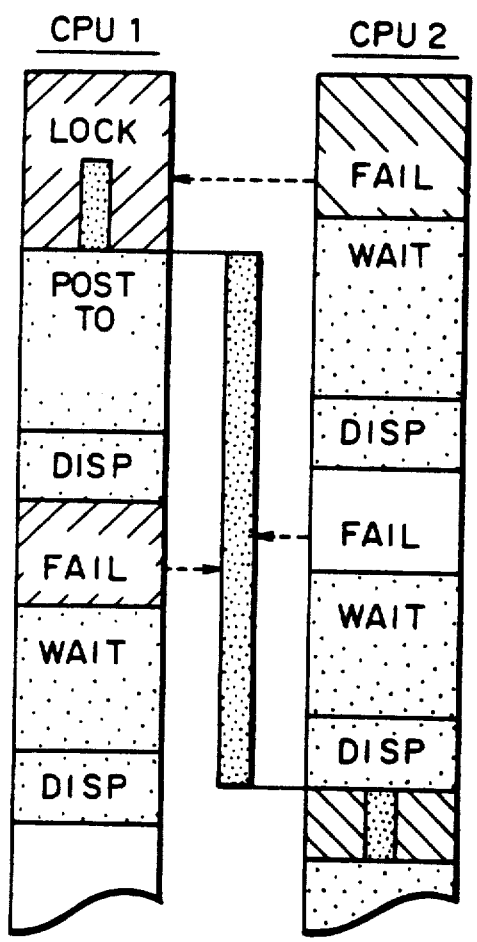
FIG. 12 is a timing chart showing the progress of other execution based on the prior art.

FIG. 12 shows an example of the operation, based on the conventional mechanism, after the task 2 running on the CPU 2 has failed to lock a shared resource because of it being locked by the task 1 running on the CPU 1. It is assumed that CPU 1 is dispatched to the task 1 again during the period until the task 2 which has been posted by the task 1 is dispatched. During this period, the task 1 or a task 3 running on the CPU 2 will fail to lock the shared resource if it is attempted.

Figure 13:
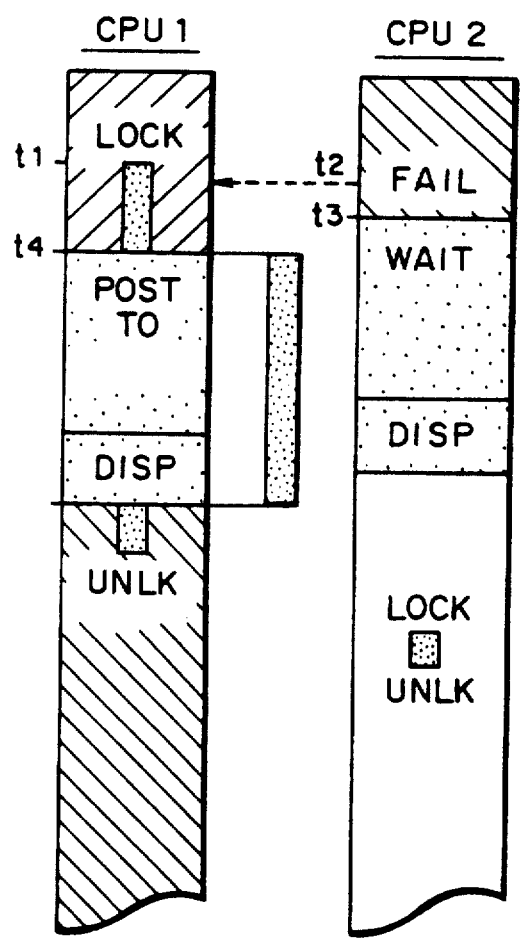
FIG. 13 is a timing chart showing the progress of other execution based on the embodiment of this invention.

FIG. 13 shows an example of the operation according to this embodiment for the same case as of FIG. 12. After the post procedure has ended, the task 2 is dispatched selectively (at $t_5$) and executed on CPU 1, and therefore the period after the commencement of the post procedure until the dispatch of task 2 (between $t_4$ and $t_5$) can be reduced. Consequently, the time of unlocking the resource by the task 2 following its execution can also be made earlier, and another task running on another processor can have the opportunity of resource lock at an earlier time point.

(d) In order to retard the increase in the overhead of dispatchers caused by task switch, according to this embodiment, the post receive task is made ready by the post procedure: (step 115 in FIG. 1A), the execution of the post issue task is preempted: (step 122 in FIG. 1C), control information pertinent to the post issue task is placed on the processor wait queue 900 in FIG. 5: (step 122 in FIG. 1C), and the processor which has been executing the post issue task is dispatched to the post receive task: (step 123 in FIG. 1C). More preferably, dispatching of the processor to the post receive task is carried out invariably as follows. At the time when a third task which has failed in resource lock is brought to the wait state by the wait procedure following the registration on the processor wait queue, the control information for the post issue task registered on the processor wait queue is retrieved: (step 127 in FIG. 1B), and the processor which has been executing the third task is dispatched to the post issue task (step 128 in FIG. 1B). Accordingly, the task search does not take place in this dispatch procedure, as has been explained previously. Consequently, the lock period of the task scheduling queue in the dispatch procedure is reduced, and the overhead attributable to lock contentions on the task scheduling queue can be reduced.

(e) In regard to the interrupt, when the execution of a locking task is suspended by an external interrupt or the like, information indicative of the suspension of the locking task is set immediately in the field (locking task status bit 303 in FIG. 5) which indicates the execution status of a locking task when a shared resource is locked: (step 145 in FIG. 1E), allowing a lock intending task to reference the information: (step 160 in FIG. 2) so that it attempts a resource lock with a spin lock mechanism if the locking task is running: (steps 155-161 in FIG. 2), or attempts a resource lock with a wait/post mechanism if the locking task is in the preempted state: (steps 162-170 in FIG. 2).

Figure 10:
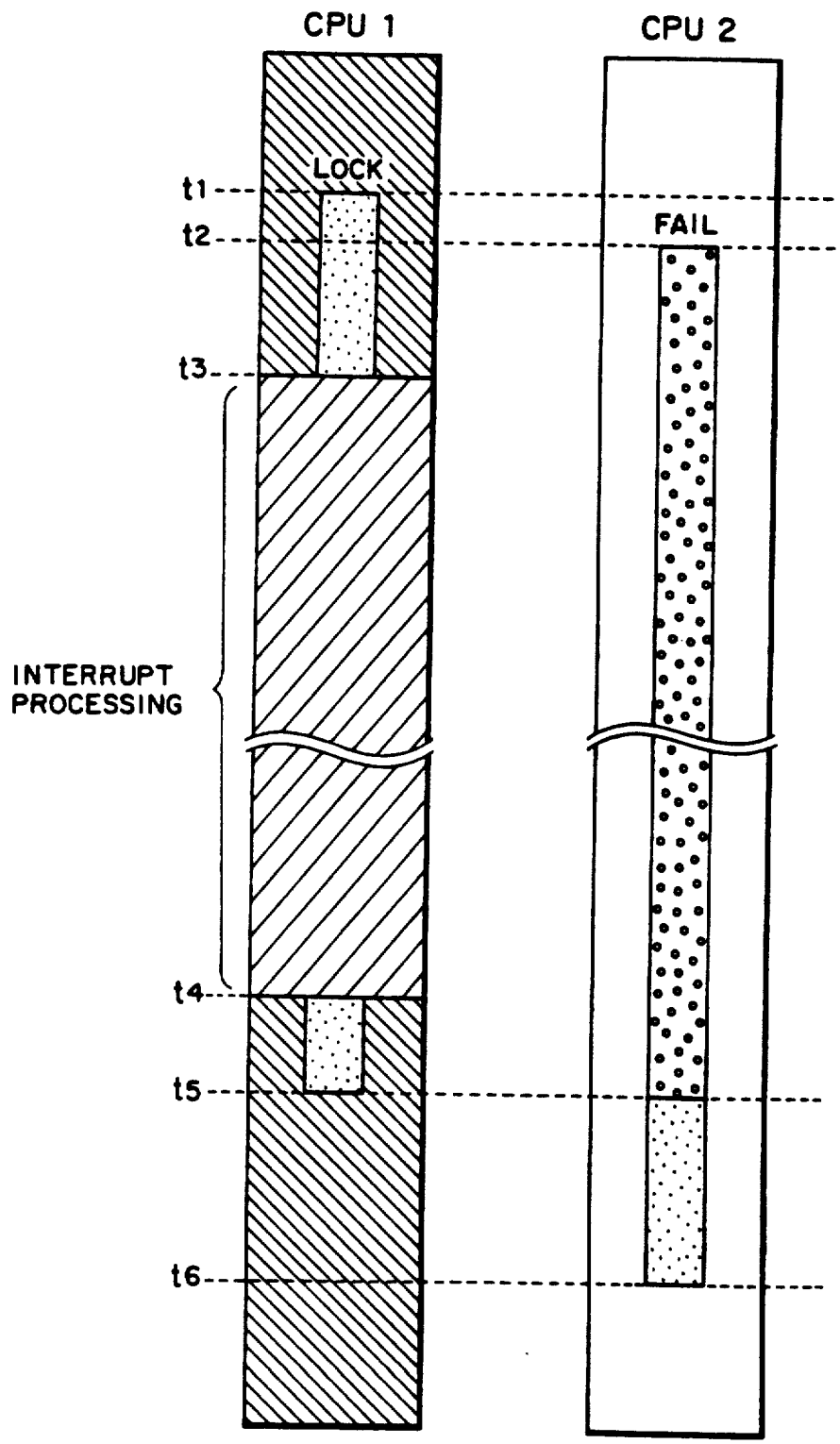
FIG. 10 is a timing chart showing the progress of other execution under the conventional task execution control.
Figure 11:
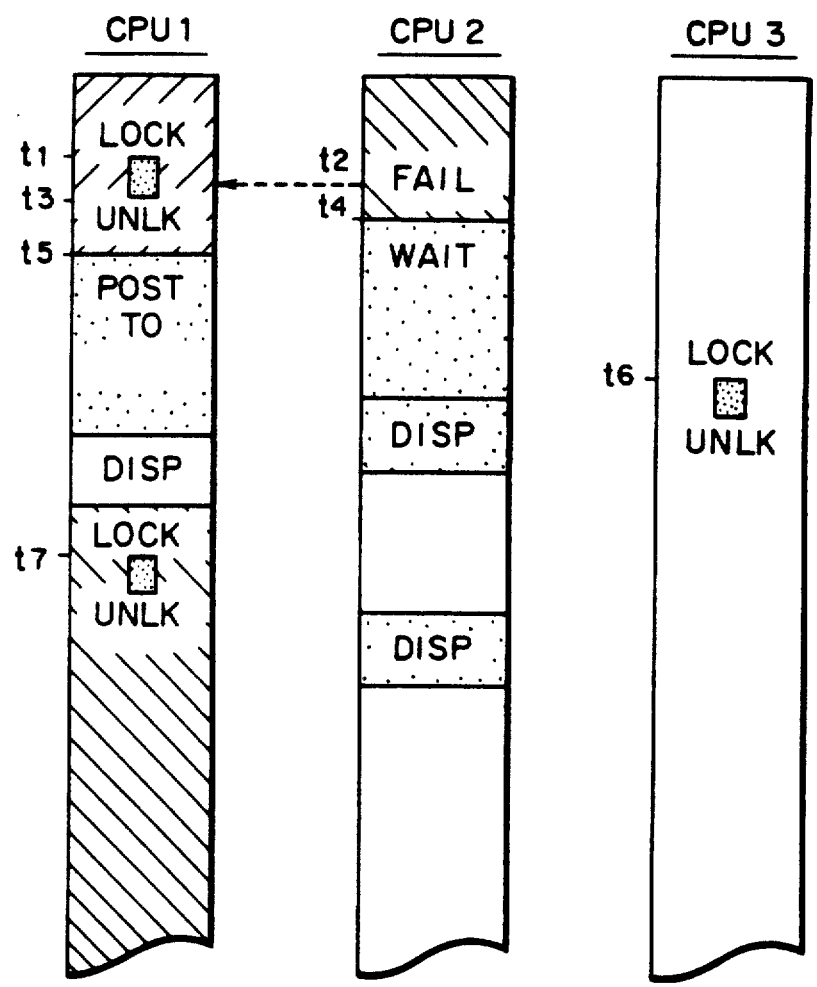
FIG. 11 is a timing chart showing the progress of task execution according to an embodiment of this invention.
Figure 14:
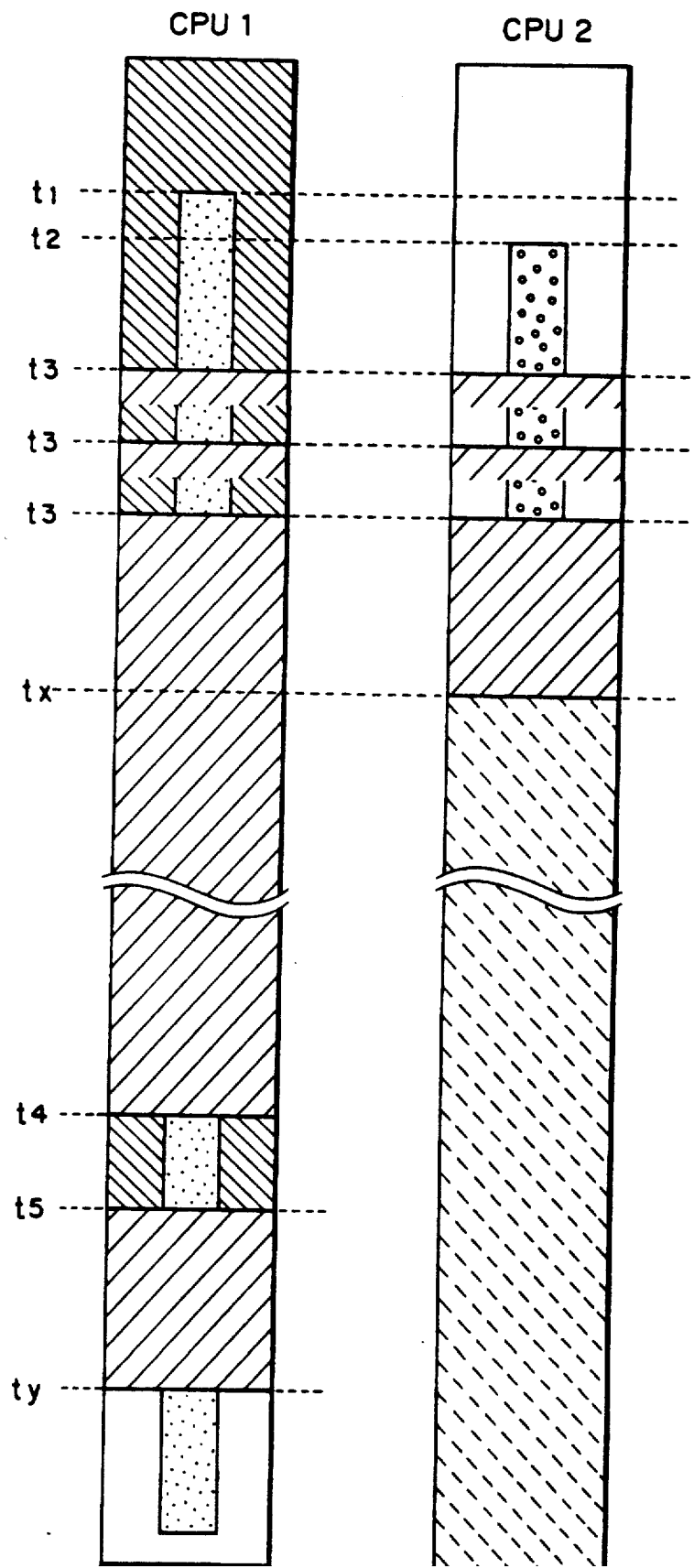
FIG. 14 is a timing chart showing the progress of other execution based on the embodiment of this invention.

FIG. 10 is a timing chart showing the operation at the occurrence of an interrupt according to the conventional mechanism described previously. During the period from $t_3$ to $t_4$ when the task 1 is preempted by an interrupt, the CPU 2 continues to spin by occupying the CPU 2. Whereas according to this embodiment, as shown in FIG. 14, when the task 1 is interrupted at t3, the interrupt trap sets the locking task status bit 303 in FIGS. 5 to 1. Then the task 2 which has been spinning since $t_2$ detects the transition of the locking task status bit to 1 and invokes the wait procedure to pass the CPU 2 to the task 3. Consequently, the CPU 2 can execute the task 3 after time point $t_x$.

As described, the problem of spin loop trap of the task 2 running on the CPU 2 in the event of the preempting of the locking task 1 due to an interrupt or the like is eliminated, and the CPU 2 swaps the task from the lock-failing task 2 to another task 3, whereby the system is operated efficiently.

(5) Variant Embodiments

Alternative techniques conceivable to replace the foregoing method which intends to reduce the overhead of dispatchers by reduced task search are as follows.

<1> Before the wait procedure brings a post receive task to the wait state, alteration of priority order is implemented so that the post receive task has a higher execution rank, and the original priority order is restored at the release of the shared resource used by the post receive task.

<2> Before a post issue task brings a post receive task out of the wait the state by the post procedure, alteration of priority order is implemented so that the post receive task has a higher execution rank, and the original priority order is restored at the release of the shared resource used by the post receive task.

These methods can readily be carried out by modifications of the foregoing embodiment, and a further detailed explanation thereof will be omitted.

As will be appreciated from the above description, the embodiment of this invention offers the following effectiveness.

(1) By controlling shared resource lock requests with the wait/post mechanism, the post procedure overhead is eliminated from the shared resource lock period, and the increase in the number of retries by a post receive task is held below a certain upper limit value, whereby the aggravation of system response is prevented.

(2) In the dispatch procedure following a post procedure or wait procedure, task search for the next dispatching is eliminated, and lock contentions on the task scheduling queue can be reduced. Namely, by the high-speed dispatch procedure in which, following the post procedure, the processor is dispatched to the task registered on the resource wait queue, and, following the wait procedure, the task registered on the processor is dispatched to the task registered on the processor wait queue, whereby the task search procedure for searching the task scheduling queue for a task to be dispatched next can be eliminated.

(3) The increase in the lock management overhead is held lower even at the occurrence of an interrupt against a shared resource locking task, and this is effective for the enhancement of the system throughput. Particularly, the inventive method, which maintain a lower proportion of lock procedure over the entire procedure, is effective for the enhancement of system performance.

What is claimed is:

1. An execution control method for units-of-processing (hereinafter called tasks) which are units each of which is dispatched to run concurrently with at least one other task on a multiprocessor system, said method comprising the steps of:

dispatching to each of a plurality of processors of said multiprocessor system, one task selected from one or a plurality of tasks which are in a steady state when a task currently running on said each of said processors has terminated or been suspended;

trying to lock a shared resource which can be shared by tasks residing on said multiprocessor system for exclusive use by a task running on one of said processors, when the particular task requires use of said shared resource;

suspending execution of said particular task and placing said particular task into a waiting state for release of said shared resource, if said shared resource has not been locked successfully as a result of execution of said trying step;

transiting, when a first task ceases to use said shared resource, at least a second task which has been placed in a waiting state for release of said shared resource by execution of said suspending step for said second task due to failure in locking said shared resource for exclusive use by said second task at execution of said trying step for said second task, to a ready state, wherein said first task is one for exclusive use of which said shared resource has been locked as a result of execution of said trying step for said first task;

unlocking said shared resource, when said first task ceases to use said shared resource, wherein said unlocking is performed before said second task is transited to a ready state by said transiting step, so that said shared resource can be locked for exclusive use by a third task which is running on a processor different from one processor on which said first task is running, if said third task happens to use said shared resource after said unlocking step; and re-executing said trying step to lock said shared resource for exclusive use by said second task, when said second task requires said shared resource after said second task is subsequently dispatched to one of said processors after said transiting step.

2. An execution control method according to claim 1, further comprising the steps of:

storing a result of lock failure when said trying sdtep has been executed either for the first time for the task or has been re-executed later on for the task and the result is failure, wherein, when the result of lock failure has been obtained at re-execution of said trying step for the task, the result of lock failure is stored together with results of lock failure obtained at preceding execution of said trying step for the task, so that a history of lock failure for the task is stored;

judging whether said history of lock failure stored for said second task satisfies a certain condition before performing said unlocking step of said shared resource; and prohibiting execution of said unlocking of said shared resource, if said certain condition is satisfied, with keeping said shared resource being locked for said first task during said transiting step and for said second task after said transiting step, so that said second task can use said shared resource without executing said re-executing step, after said second task is dispatched to one of said processors.

3. An execution control method according to claim 2, wherein said certain condition indicates a total count of failures of locking said shared resource for exclusive use by a same task exceeds a certain value.

4. An execution control method for units-of-processing (hereinafter called tasks) which are units each of which is selectively dispatched to run concurrently with at least one other task on a multiprocessor system, comprising the steps of:

dispatching to each one of a plurality of processors of said multiprocessor system, one task selected from one or a plurality of tasks which are in a ready state when a task currently running on said each one of said processors has terminated or been suspended;

trying to lock a shared resource which can be shared by tasks residing on said multiprocessor system, for exclusive use by a task running on one of said processors, when said particular task requires use of said shared resource;

suspending execution of said particular task and placing said particular task into a waiting state for release of said shared resource, if said shared resource has not been locked successfully as a result of execution of said trying step;

transiting, when a first task ceases to use said shared task, at least a second task which has been placed in a waiting state for release of said shared resource by execution of said suspending step for said second task due to failure in locking said shared resource for exclusive use by said second task at execution of said trying step for said second task, to a ready state, wherein said first task is one for exclusive use of which said shared resource ha been locked as a result of execution of said trying step for said first task; and placing said first task into a ready state when said second task is transited to a ready state by said transiting step.

5. An execution control method for units-of-processing (hereinafter called tasks) which are units each of which is dispatched to run concurrently with at least one other task on a multiprocessor system, comprising the steps of:

dispatching to each one of a plurality of processors of said multiprocessor system, one task selected from one or a plurality of tasks which are in a ready state when a task currently running on said each one of said processors has terminated or been suspended;

trying to lock a shared resource which can be shared by tasks running on said multiprocessor system for exclusive use by a task running on one of said processors, when said particular task requires use of said shared resource;

suspending execution of said particular task and placing said particular task into a waiting state for release of said shared resource, if said shared resource has not been locked successfully as a result of said trying step;

transiting at least one first task which has been placed in a waiting state for release of said shared resource by execution of said suspending step for said second task due to failure in locking said shared resource for exclusive use by said second task at execution of said trying step for said second task, to a ready state, wherein said first task is one for exclusive use by which said shared resource after locking thereof has been locked as a result of execution of said trying step for said first task; and altering an execution priority rank of a task to a higher execution priority rank when said particular task has been suspended by execution of said suspending step for said particular task, wherein said dispatching step includes selecting one task to be dispatched from tasks which are in a ready state, based upon current execution priority ranks of those tasks.

6. An execution control method for units-of-processing (hereinafter called tasks) which are units each of which is dispatched to run concurrently with at least one other task on a multiprocessor system, comprising the steps of:

dispatching to each one of a plurality of processors of said multiprocessor system, one task selected from one or a plurality of tasks which are in a ready state when a task currently running on said each one of said processors has terminated or been suspended;

trying to lock a shared resource which can be shared by tasks resident on said multiprocessor system for exclusive use by a task running on one of said processors, when said particular task requires use of said shared resource;

suspending execution of said particular task and placing said particular task into a waiting state for release of said shared resource, if said shared resource has not been locked successfully as a result of execution of said trying step;

transiting, when a first task ceases to use said shared resource, at least one second task which is in a waiting state for release of said shared resource due to failure in locking said shared resource for exclusive use by said second task at execution of said trying step for said second task, into a ready state, wherein said first task is one for exclusive use by which said shared resource has been locked as a result of execution of said trying step for said first task; and altering an execution priority rank of said second task to a higher execution priority rank, when said second task is transited to a ready state by execution of said transiting step for said second task, wherein said dispatching step includes selecting one task from tasks which are in a ready state, based upon current execution priority ranks of those tasks.

7. An execution control method according to claim 4, further comprising the step of dispatching said first task with a higher priority of dispatching than a priority of dispatching of another task which is in a ready state, to one of said processors, when a task running on the one processor terminates or is suspended.

8. An execution control method for concurrently running units-of-processing (hereinafter called tasks) which are units to be dispatched on a multiprocessor system, comprising the steps of:

dispatching to each one of a plurality of processors of said multiprocessor system, one task selected from one or a plurality of tasks which are in a ready state when a task currently running on said each one of said processors has terminated or been suspended;

storing information indicating interception of a first task running on one of said processors, if execution of said first task is intercepted due to an interrupt to be processed by the one processor and a shared resource which can be shared by tasks resident on said multiprocessor system is already locked for said first task at the time of the interception;

cancelling said stored information when said first task is re-executed after said interrupt has been processed;

trying to lock said shared resource for exclusive use by a second task running on a processor different from said one processor, when said second task requires use of said shared resource;

examining whether or not said information is stored, if said trying to lock said shared resource is unsuccessful;

suspending execution of said second task and placing said second task in a waiting state for release of said shared resource, fi said information is detected; and re-executing said trying step when said information is not detected.

9. An execution control method according to claim 2, wherein said second task is one which has been least recently p,.aced in a waiting state for release of said shared resource among said one or a plurality of tasks which are in a waiting state for release of said shared resource.

10. An execution control method according to claim 4, further comprising the step of:

dispatching said second task to one of said processors on which said first task has been running, with a higher priority of dispatching than a priority of dispatching of another task which is in a ready state.

11. An execution control method according to claim 4, wherein said shared resource is kept locked for said first task during said transiting step and for said second task after said transiting step, so that said second task can use said shared resource without executing said trying step when said second task is dispatched later on.

12. An execution control method according to claim 11, wherein said second task is one which has been least recently placed into a waiting state for release of said shared resource among one or plural tasks which are in the waiting state.

13. An execution control method according to claim 5, further comprising the step of:

restoring an execution priority rank of said first task to said execution priority rank before said altering step, when said first task is subsequently to be dispatched to one of said processors.

14. An execution control method according to claim 5, wherein said shared resource is kept locked for said first task during said transiting step and for said second task after said transiting step, so that said second task can use said shared resource without executing said trying step when said second task is dispatched later on.

15. An execution control method according to claim 14, wherein said second task is the one which has been least recently placed into a waiting state for said shared resource among said tasks which are in a waiting state for said shared resource.

16. An execution control method according to claim 6, further comprising the step of:

restoring an execution priority rank of said second task to said execution priority rank before said altering when said second task is subsequently to be dispatched to one of said processors.

17. An execution control method according to claim 6, wherein said shared resource is kept locked for said first task during said transiting step and for said second task after said transiting step, so that said second task can use said shared resource without executing said trying step when said second task is dispatched later on.

18. An execution control method according to claim 17, wherein said second task is one which has been least recently transited to a waiting state for release of said shared resource among tasks which are in a waiting state for release ofs aid shared resource.

19. An execution control method according to claim 8, further comprising the step of:

transiting one task selected from one or a plurality of tasks which are in a waiting state for release ofs aid shared resource to a ready state, when said first task subsequently ceases to use said shared resource, in case said second task has been suspended by said suspending step.

20. An execution control method according to claim 19, wherein said shared resource is kept locked for said first task during said transiting step and for one of tasks which are in a ready state after said transiting step, so that said second task can use said shared resource without executing said trying step when said second task is dispatched later one.

21. An execution control method according to claim 20, wherein the one task which is transited to a ready state by said transiting step is one which has been least recently placed into a waiting state for release of said shared resource among one or a plurality of tasks which are in a waiting state for release of said shared resource.

* * * * *